US008302946B2

(12) United States Patent
Kojima et al.

(10) Patent No.: US 8,302,946 B2
(45) Date of Patent: Nov. 6, 2012

(54) VIBRATION PROOFING APPARATUS

(75) Inventors: Hiroshi Kojima, Yokohama (JP); Yoshitaka Otsubo, Yokohama (JP)

(73) Assignees: Bridgestone Corporation, Tokyo (JP); Honda Motor Co., Ltd., Tokyo (JP)

( * ) Notice: Subject to any disclaimer, the term of this patent is extended or adjusted under 35 U.S.C. 154(b) by 1104 days.

(21) Appl. No.: 11/664,066

(22) PCT Filed: Sep. 29, 2005

(86) PCT No.: PCT/JP2005/017980
§ 371 (c)(1), (2), (4) Date: Aug. 29, 2008

(87) PCT Pub. No.: WO2006/035886
PCT Pub. Date: Apr. 6, 2006

(65) Prior Publication Data
US 2009/0026670 A1    Jan. 29, 2009

(30) Foreign Application Priority Data

Sep. 29, 2004 (JP) ................. 2004-284700
Sep. 29, 2004 (JP) ................. 2004-284701
Jan. 31, 2005 (JP) ................. 2005-022656

(51) Int. Cl.
*F16F 5/00* (2006.01)

(52) U.S. Cl. ............ 267/140.13; 248/638; 267/140.11; 267/140.4

(58) Field of Classification Search ........... 267/118, 267/121, 122, 140, 140.11, 140.13, 140.3, 267/140.4, 140.5, 141; 248/636, 638
See application file for complete search history.

(56) References Cited

U.S. PATENT DOCUMENTS 5,172,893 A   12/1992 Bouhier et al.
6,409,158 B1 *  6/2002 Takashima et al. ...... 267/140.13
6,443,438 B2 *  9/2002 Satori et al. ............. 267/140.13
(Continued)

FOREIGN PATENT DOCUMENTS
DE    3618767 A1   12/1987
(Continued)

OTHER PUBLICATIONS

International Search Report dated Oct. 27, 2005, with English translation.

(Continued)

*Primary Examiner* — Bradley King
*Assistant Examiner* — Thomas Irvin
(74) *Attorney, Agent, or Firm* — Carrier Blackman & Associates, P.C.; Joseph P. Carrier; William D. Blackman

(57) ABSTRACT

In a vibration proofing apparatus, two second pressure receiving liquid chambers are arranged between an outer tube and a mounting attachment, and are configured to communicate with an auxiliary liquid chamber through two second orifices when an auxiliary vibration along an auxiliary amplitude direction orthogonal to an axial direction is input to the mounting attachment, a rubber elastic body is elastically deformed along an auxiliary amplitude direction, and expands and contracts an internal volume of the second pressure receiving liquid chambers. At this time, since a resonance phenomenon is generated in the liquid circulating between the second pressure receiving liquid chambers and the auxiliary liquid chamber through the second orifices in synchronization with the input auxiliary vibration, a low-frequency vibration input along the auxiliary amplitude direction due to a pressure change, and a viscous resistance generated together with the resonance phenomenon of the liquid is effectively absorbed.

13 Claims, 12 Drawing Sheets

U.S. PATENT DOCUMENTS

| | | | |
|---|---|---|---|
| 6,505,822 B1 * | 1/2003 | Yamamoto et al. | 267/140.13 |
| 6,523,813 B1 * | 2/2003 | Kato | 267/140.11 |
| 6,557,839 B2 * | 5/2003 | Tanaka | 267/140.13 |
| 6,598,865 B1 * | 7/2003 | Kato | 267/140.13 |
| 6,820,867 B2 * | 11/2004 | Satori et al. | 267/140.13 |
| 7,044,455 B2 * | 5/2006 | Yoshida et al. | 267/140.13 |
| 7,293,755 B2 * | 11/2007 | Miyahara et al. | 248/562 |
| 7,314,213 B2 * | 1/2008 | Tanaka | 267/140.5 |
| 7,458,565 B2 * | 12/2008 | Miyahara | 267/140.11 |
| 2002/0145240 A1 * | 10/2002 | Satori et al. | 267/140.13 |
| 2002/0158389 A1 | 10/2002 | Yoshida et al. | |
| 2009/0283945 A1 * | 11/2009 | Kojima et al. | 267/140.13 |

FOREIGN PATENT DOCUMENTS

| | | |
|---|---|---|
| FR | 2587429 | 3/1987 |
| JP | 2-203039 A | 8/1990 |
| JP | 2002-21914 A | 1/2002 |
| JP | 2002-310221 A | 10/2002 |
| JP | 2004-68938 A | 3/2004 |

OTHER PUBLICATIONS

Written Opinion dated Oct. 11, 2005, with English translation.

* cited by examiner

VIBRATION PROOFING APPARATUS

TECHNICAL FIELD

The present invention relates to a liquid sealed type vibration proofing apparatus which is used as an engine mount or the like in a general industrial machine or a motor vehicle, and absorbs a vibration from a vibration generating portion such as an engine or the like so as to prevent the vibration from being transmitted to a vibration receiving portion such as a vehicle body or the like.

BACKGROUND ART

For example, a vibration proofing apparatus serving as an engine mount is arranged between an engine as a vibration generating portion of a vehicle and a vehicle body as a vibration receiving portion, and the vibration proofing apparatus absorbs a vibration generated by the engine, and attenuates and absorbs the vibration transmission to the vehicle body side. As the vibration proofing apparatus mentioned above, there has been known a liquid sealing type structure in which an elastic body, a pressure receiving liquid chamber and an auxiliary liquid chamber are provided in an inner portion of the apparatus, and these liquid chambers are communicated with each other through a limit passage. In accordance with the liquid sealed type vibration proofing apparatus, in the case that the mounted engine is actuated and the vibration is generated, the vibration is absorbed due to a vibration attenuating function of the elastic material, a viscous resistance of the liquid circulating within an orifice communicating between a pair of liquid chambers and the like, and the vibration transmission to the vehicle body side is suppressed.

As a conventional liquid sealed type vibration proofing apparatus, for example, there is a structure shown in patent document 1. A vibration proofing apparatus described in the patent document 1 has a tubular attachment, a mounting attachment arranged in an inner peripheral side of the tubular attachment, and an elastic body elastically coupling the mounting attachment to the tubular attachment. The vibration proofing apparatus is provided with an upper liquid chamber having the elastic body as a part of an inner wall, a lower liquid chamber having a diaphragm as a part of a partition wall, and a first orifice communicating these liquid chambers with each other, and is provided with four peripheral liquid chambers C1, C2, D1 and D2 arranged along a peripheral direction between the tubular attachment and the elastic body and each having the elastic body as a part of an inner wall. The vibration proofing apparatus is also provided with a second orifice communicating two (a set of) peripheral liquid chambers C1 and D1 adjacent to each other among these four peripheral liquid chambers, and a third orifice communicating the other set of peripheral liquid chambers C2 and D2.

In the vibration proofing apparatus structured as mentioned above, in addition to the upper liquid chamber and the lower liquid chamber communicated with each other by the first orifice, since four peripheral liquid chambers C1, C2, D1 and D2 are provided between the tubular attachment and the elastic body, the peripheral liquid chambers C1 and D1 are communicated with each other by the second orifice, and the peripheral liquid chambers C2 and D2 are communicated with each other by the third orifice, it is possible to effectively attenuate and absorb the vibration along a lateral direction or a longitudinal direction of the vehicle due to an inner friction of the elastic body, a viscous resistance of the liquid circulating through the second and third orifices, and the like, in addition that it is possible to attenuate and absorb the vibration due to the inner friction of the elastic body, the viscous resistance of the liquid and the like at a time of inputting the vibration in a vertical direction, in the case of being applied as the vibration proofing apparatus of the engine of the vehicle.

Patent Document 1: Japanese Patent Application Laid-Open (JP-A) No. 2004-68938 (FIG. 1)

DISCLOSURE OF THE INVENTION

Problem to be Solved by the Invention

However, in the vibration proofing apparatus in the patent document 1 mentioned above, if it is intended to make an internal volume of each of a plurality of peripheral liquid chambers sufficiently large, a thickness of a partition wall portion of the elastic body comparting between these peripheral liquid chambers becomes small, and it is hard to make a path length of the orifice formed in the partition wall portion sufficiently long. Accordingly, in the vibration proofing apparatus in the patent document 1, it is hard to tune the path length of the orifice communicating the peripheral liquid chambers so as to correspond to a vibration (an auxiliary vibration) having a low frequency (for example, 10 Hz or less), unless a size of the apparatus is enlarged. In the case that the vibration input along the lateral direction or the longitudinal direction of the vehicle has a low frequency, there is generated a problem that it is impossible to effectively attenuate and absorb the vibration mentioned above.

An object of the present invention is to provide a vibration proofing apparatus which can effectively attenuate and absorb an auxiliary vibration even in the case that the auxiliary vibration input along a direction approximately orthogonal to a main vibration input along an axial direction of the apparatus, in addition that it is possible to effectively attenuate and absorb the main vibration while suppressing an engagement of a size of the apparatus, after taking the fact mentioned above into consideration.

Means for Solving the Problem

In order to achieve the object mentioned above, in accordance with a first aspect of the present invention, there is provided a vibration proofing apparatus comprising:

a first mounting member coupled to one of a vibration generating portion and a vibration receiving portion, and formed in an approximately tubular shape;

a second mounting member coupled to the other of the vibration generating portion and the vibration receiving portion, and arranged in an inner peripheral side of the first mounting member;

a rubber elastic body arranged between the first mounting member and the second mounting member, and elastically coupling the first mounting member and the second mounting member;

a first pressure receiving liquid chamber arranged in an outer side in an axial direction of the second mounting member in all inner peripheral side of the first mounting member, and in which at least a part of an inner wall is formed by the elastic body, and a liquid is filled;

an auxiliary liquid chamber in which the liquid is filled, a part of a partition wall is formed by a diaphragm and an internal volume is capable of being expanded and contracted in correspondence to a liquid pressure change;

a first limit passage communicating the first pressure receiving liquid chamber and the auxiliary liquid chamber with each other so as to make the liquid circulatable;

a second pressure receiving liquid chamber arranged between the first mounting member and the second mounting member, and in which at least a part of an inner wall is formed by the elastic body, and the liquid is filled; and a second limit passage communicating the second pressure receiving liquid chamber and the auxiliary liquid chamber with each other so as to make the liquid circulatable.

A description will be given below of an operation of the vibration proofing apparatus in accordance with the first aspect of the present invention.

In the vibration proofing apparatus in accordance with the first aspect, basically, when the vibration is input to any one of the first and second mounting members from the vibration generating portion side, the elastic body arranged between the first mounting member and the second mounting member is elastically deformed by this input vibration, the vibration is absorbed by the attenuation operation due to the internal friction of the elastic body or the like, and the vibration transmitted to the vibration receiving portion side is reduced. At this time, even though the input vibration is constituted by a vibration in a main amplitude direction approximately coinciding with the axial direction of the apparatus, or a vibration in an auxiliary amplitude direction approximately orthogonal to the main amplitude direction, a part of the input vibration is absorbed by the attenuation operation of the elastic body.

Further, in the vibration proofing apparatus in accordance with the first aspect, when the vibration along the main amplitude direction is input to the first mounting member or the second mounting member from the vibration generating portion side, due to the communication of the first pressure receiving liquid chamber arranged in the outer side in the axial direction of the second mounting member in the inner peripheral side of the first mounting member with the auxiliary liquid chamber through the first limit passage, the elastic body is elastically deformed along the main amplitude direction, and expands and contracts the internal volume of the first pressure receiving liquid chamber. Accordingly, the liquid circulates the first pressure receiving liquid chamber and the auxiliary liquid chamber with each other through the first limit passage. At this time, if a path length and a cross sectional area in the first limit passage, that is, a circulation resistance of the liquid is set (tuned) in correspondence to a frequency of the vibration input along the main amplitude direction, a resonance phenomenon is generated in the liquid circulating between the first pressure receiving liquid chamber and the auxiliary liquid chamber in synchronization with the input vibration, between the first pressure receiving liquid chamber and the auxiliary liquid chamber through the first limit passage. Accordingly, it is possible to effectively absorb the input vibration along the main amplitude direction due to a pressure change caused by the resonance phenomenon of the liquid and a viscous resistance.

Further, in the vibration proofing apparatus in accordance with the first aspect, when the vibration along the auxiliary amplitude direction is input to the first mounting member or the second mounting member from the vibration generating portion side, due to the communication of the second pressure receiving liquid chamber arranged between the first mounting member and the second mounting member with the auxiliary liquid chamber through the second limit passage, the elastic body is elastically deformed along the auxiliary amplitude direction, and expands and contracts the internal volume of the second pressure receiving liquid chamber. Accordingly, the liquid circulates the second pressure receiving liquid chamber and the auxiliary liquid chamber with each other through the second limit passage. At this time, if a path length and a cross sectional area in the second limit passage, that is, a circulation resistance of the liquid is set (tuned) in correspondence to a frequency of the vibration input along the auxiliary amplitude direction, a resonance phenomenon is generated in the liquid circulating between the second pressure receiving liquid chamber and the auxiliary liquid chamber with each other in synchronization with the input vibration, between the second pressure receiving liquid chamber and the auxiliary liquid chamber through the second limit passage. Accordingly, it is possible to effectively absorb the input vibration along the auxiliary amplitude direction due to the pressure change caused by the resonance phenomenon of the liquid and the viscous resistance.

Further, in the vibration proofing apparatus in accordance with the first aspect, the second pressure receiving liquid chamber is arranged between the first mounting member and the second mounting member, and at least a part of the inner wall is formed by the elastic body, however, the auxiliary liquid chamber can be installed at a position which is isolated from the elastic body, without being limited in an arranged position as is different from the first and second pressure receiving liquid chamber. Accordingly, it is possible to make an interval between the second pressure receiving liquid chamber and the auxiliary liquid chamber sufficiently wide, and it is possible to make the path length of the second limit passage communicating the second pressure receiving liquid chamber and the auxiliary liquid chamber sufficiently long. As a result, even in the case that the vibration input along the auxiliary amplitude direction has a low frequency, it is possible to effectively attenuate and absorb the vibration having the low frequency mentioned above.

Further, in accordance with a second aspect of the present invention, there is provided a vibration proofing apparatus as recited in the first aspect, wherein a partition member is arranged in an inner peripheral side of the first mounting member, the partition member comparts the second pressure receiving liquid chamber and the auxiliary liquid chamber, and the second limit path is formed in the partition member.

Further, in accordance with a third aspect of the present invention, there is provided a vibration proofing apparatus as recited in the first or second aspect, wherein when the elastic body is elastically deformed by the input of the vibration along the main amplitude direction approximately coinciding with the axial direction to the first mounting member or the second mounting member, the elastic body expands and contracts an internal volume of the first pressure receiving liquid chamber due to the elastic deformation along the main amplitude direction.

Further, in accordance with a fourth aspect of the present invention, there is provided a vibration proofing apparatus as recited in the third aspect, wherein if the elastic body is elastically deformed by the input of the vibration along the auxiliary amplitude direction approximately orthogonal to the axial direction to the first mounting member or the second mounting member, the elastic body expands and contracts an internal volume of the second pressure receiving liquid chamber due to the elastic deformation along the auxiliary amplitude direction.

Further, in accordance with a fifth aspect of the present invention, there is provided a vibration proofing apparatus as recited in the fourth aspect, wherein the second pressure receiving liquid chamber is provided in one end side along the auxiliary amplitude direction between the first mounting member and the second mounting member, a cavity portion is provided in the other end side along the auxiliary amplitude direction between the first mounting member and the second mounting member, and at least a part of an inner wall of the cavity portion is formed by the elastic body, thereby approximately balancing a rigidity against an input load toward the one end side along the auxiliary amplitude direction of the elastic body and an input load toward the other end side.

Further, in accordance with a sixth aspect of the present invention, there is provided a vibration proofing apparatus as recited in the first or second aspect, wherein if the elastic body is elastically deformed by the input of the vibration along the main amplitude direction approximately coinciding with the axial direction to the first mounting member or the second mounting member, the elastic body expands and contracts an internal volume of the first pressure receiving liquid chamber and the second pressure receiving liquid chamber due to the elastic deformation along the main amplitude direction.

In accordance with a seventh aspect of the present invention, there is provided a vibration proofing apparatus comprising:

a first mounting member coupled to one of a vibration generating portion and a vibration receiving portion, and formed in an approximately tubular shape;

a second mounting member coupled to the other of the vibration generating portion and the vibration receiving portion, and arranged in an inner peripheral side of the first mounting member;

a rubber elastic body arranged between the first mounting member and the second mounting member, and elastically coupling the first mounting member and the second mounting member;

a first pressure receiving liquid chamber arranged in an outer side in an axial direction of the second mounting member in an inner peripheral side of the first mounting member, and in which at least a part of an inner wall is formed by the elastic body, and a liquid is filled;

an auxiliary liquid chamber in which the liquid is filled, a part of a partition wall is formed by a diaphragm and an internal volume is capable of being expanded and contracted in correspondence to a liquid pressure change;

a first limit passage communicating the first pressure receiving liquid chamber and the auxiliary liquid chamber with each other so as to make the liquid circulatable;

a plurality of second pressure receiving liquid chambers arranged between the first mounting member and the second mounting member, and in which at least a part of an inner wall is formed by the elastic body, and the liquid is filled; and a plurality of second limit passages communicating each of a plurality of second pressure receiving liquid chambers with the auxiliary liquid chamber so as to make the liquid circulatable between a plurality of second pressure receiving liquid chambers and the auxiliary liquid chamber.

A description will be given below of an operation of the vibration proofing apparatus in accordance with the seventh aspect of the present invention.

In the vibration proofing apparatus in accordance with the seventh aspect, basically, when the vibration is input to any one of the first and second mounting members from the vibration generating portion side, the elastic body arranged between the first mounting member and the second mounting member is elastically deformed by this input vibration, the vibration is absorbed by the attenuation operation due to the internal friction of the elastic body or the like, and the vibration transmitted to the vibration receiving portion side is reduced. At this time, even if the input vibration is constituted by a vibration in a main amplitude direction approximately coinciding with the axial direction of the apparatus, or a vibration in an auxiliary amplitude direction approximately orthogonal to the main amplitude direction, a part of the input vibration is absorbed by the attenuation operation of the elastic body.

Further, in the vibration proofing apparatus in accordance with the seventh aspect, when the vibration along the main amplitude direction is input to the first mounting member or the second mounting member from the vibration generating portion side, due to the communication of the first pressure receiving liquid chamber arranged in the outer side in the axial direction of the second mounting member in the inner peripheral side of the first mounting member with the auxiliary liquid chamber through the first limit passage, the elastic body is elastically deformed along the main amplitude direction, and expands and contracts the internal volume of the first pressure receiving liquid chamber. Accordingly, the liquid circulates the first pressure receiving liquid chamber and the auxiliary liquid chamber with each other through the first limit passage. At this time, if a path length and a cross sectional area in the first limit passage, that is, a circulation resistance of the liquid is set (tuned) in correspondence to a frequency of the vibration input along the main amplitude direction, a resonance phenomenon is generated in the liquid circulating between the first pressure receiving liquid chamber and the auxiliary liquid chamber in synchronization with the input vibration, between the first pressure receiving liquid chamber and the auxiliary liquid chamber through the first limit passage. Accordingly, it is possible to effectively absorb the input vibration along the main amplitude direction due to a pressure change caused by the resonance phenomenon of the liquid and a viscous resistance.

Further, in the vibration proofing apparatus in accordance with the seventh aspect, when the vibration along the auxiliary amplitude direction is input to the first mounting member or the second mounting member from the vibration generating portion side, due to the communication of each of the plurality of second pressure receiving liquid chambers arranged between the first mounting member and the second mounting member with the auxiliary liquid chamber through each of the plurality of second limit passages, the elastic body is elastically deformed along the auxiliary amplitude direction, and expands and contracts the internal volume of at least one second pressure receiving liquid chamber among the plurality of second pressure receiving liquid chambers. Accordingly, the liquid circulates between the second pressure receiving liquid chamber having the expanded or contracted internal volume and the auxiliary liquid chamber with each other through the second limit passage. At this time, if a path length and a cross sectional area in the plurality of second limit passages, that is, a circulation resistance of the liquid is set (tuned) in correspondence to a frequency of the vibration input along the auxiliary amplitude direction, a resonance phenomenon (a liquid column resonance) is generated in the liquid circulating with each other in synchronization with the input vibration, between the second pressure receiving liquid chamber and the auxiliary liquid chamber through the second limit passage. Accordingly, it is possible to effectively absorb the input vibration along the auxiliary amplitude direction due to the pressure change of the liquid caused by the liquid column resonance of the liquid and the viscous resistance.

Further, in the vibration proofing apparatus in accordance with the seventh aspect, each of the plurality of second pressure receiving liquid chambers is arranged between the first mounting member and the second mounting member, and at least a part of the inner wall is formed by the elastic body, however, the auxiliary liquid chamber can be installed at a position which is isolated from the elastic body, without being limited in an arranged position as is different from the first and second pressure receiving liquid chamber. Accordingly, it is possible to make an interval between the second pressure receiving liquid chamber and the auxiliary liquid chamber sufficiently wide, and it is possible to make the path length in the plurality of second limit passages respectively communicating the plurality of second pressure receiving liquid chambers and the auxiliary liquid chamber sufficiently long. Accordingly, even in the case that the vibration input along the auxiliary amplitude direction has a low frequency while suppressing an enlargement of the apparatus size, it is possible to effectively attenuate and absorb the vibration having the low frequency mentioned above.

Further, in accordance with an eighth aspect of the present invention, there is provided a vibration proofing apparatus as recited in the seventh aspect, wherein a partition member is arranged in an inner peripheral side of the first mounting member, the partition member comparts the plurality of second pressure receiving liquid chambers and the auxiliary liquid chamber, and the plurality of second limit paths are formed in the partition member.

Further, in accordance with a ninth aspect of the present invention, there is provided a vibration proofing apparatus as recited in the seventh or eighth aspect, wherein when the elastic body is elastically deformed by the input of the vibration along the main amplitude direction approximately coinciding with the axial direction to the first mounting member or the second mounting member, the elastic body expands and contracts an internal volume of the first pressure receiving liquid chamber due to the elastic deformation along the main amplitude direction.

Further, in accordance with a tenth aspect of the present invention, there is provided a vibration proofing apparatus as recited in the ninth aspect, wherein when the elastic body is elastically deformed by the input of the vibration along the auxiliary amplitude direction approximately orthogonal to the axial direction to the first mounting member or the second mounting member, the elastic body expands and contracts an internal volume of the second pressure receiving liquid chamber due to the elastic deformation along the auxiliary amplitude direction.

Further, in accordance with an eleventh aspect of the present invention, there is provided a vibration proofing apparatus as recited in the eighth or ninth aspect, wherein when the elastic body is elastically deformed by the input of the vibration along the main amplitude direction approximately coinciding with the axial direction to the first mounting member or the second mounting member, the elastic body expands and contracts an internal volume of the first pressure receiving liquid chamber and the second pressure receiving liquid chamber due to the elastic deformation along the main amplitude direction.

Further, in accordance with a twelfth aspect of the present invention, there is provided a vibration proofing apparatus as recited in the tenth or eleventh aspect, wherein a pair of the second pressure receiving liquid chambers are provided between the first mounting member and the second mounting member, one of the second pressure receiving liquid chambers is arranged in one end side along the auxiliary amplitude direction between the first mounting member and the second mounting member, and the other of the second pressure receiving liquid chambers is arranged in the other end side along the auxiliary amplitude direction between the second mounting member and the second mounting member.

Further, in accordance with a thirteenth aspect of the present invention, there is provided a vibration proofing apparatus as recited in any one of the first to twelfth aspects, wherein an elastic partition wall portion is formed in the elastic body, the elastic partition wall portion comparts the second pressure receiving liquid chamber from an external space, and is elastically deformable in a direction of expanding and contracting the internal volume of the second pressure receiving liquid chamber, and a cross sectional shape along the auxiliary amplitude direction of the elastic partition wall portion is formed in such a convex shape as to bulge toward a room inside of the second pressure receiving liquid chamber.

Effect of the Invention

As described above, in accordance with the vibration proofing apparatus of the present invention, it is possible to effectively attenuate and absorb the auxiliary vibration even in the case that the frequency of the auxiliary vibration input along the direction approximately orthogonal to the main vibration is low, in addition that it is possible to effectively attenuate and absorb the main vibration input along the axial direction of the apparatus while suppressing the enlargement of the apparatus size.

BEST MODE FOR CARRYING OUT THE INVENTION

A description will be given below of a vibration proofing apparatus in accordance with an embodiment of the present invention with reference to the accompanying drawings.

(First Embodiment)

Figure 1:
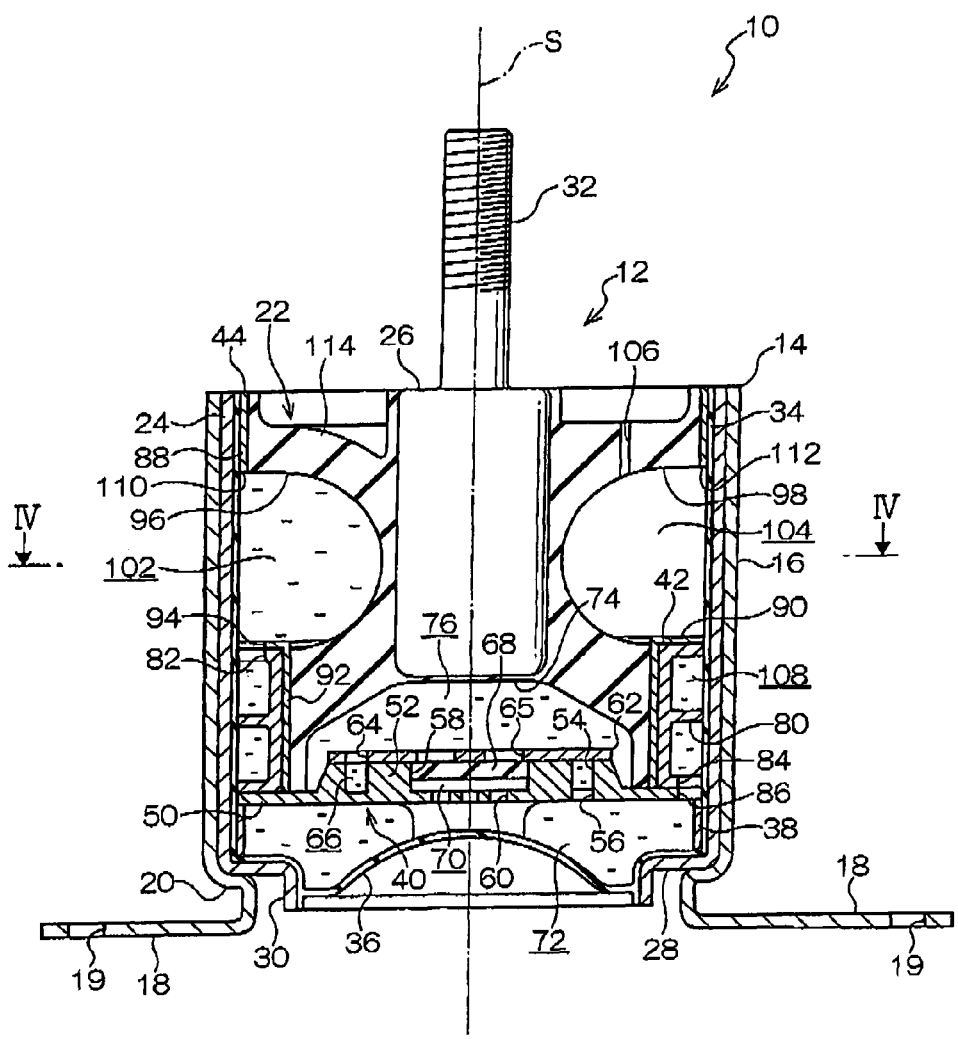
FIG. 1 is a side cross sectional view showing a structure of a vibration proofing apparatus in accordance with a first embodiment of the present invention.
Figure 2:
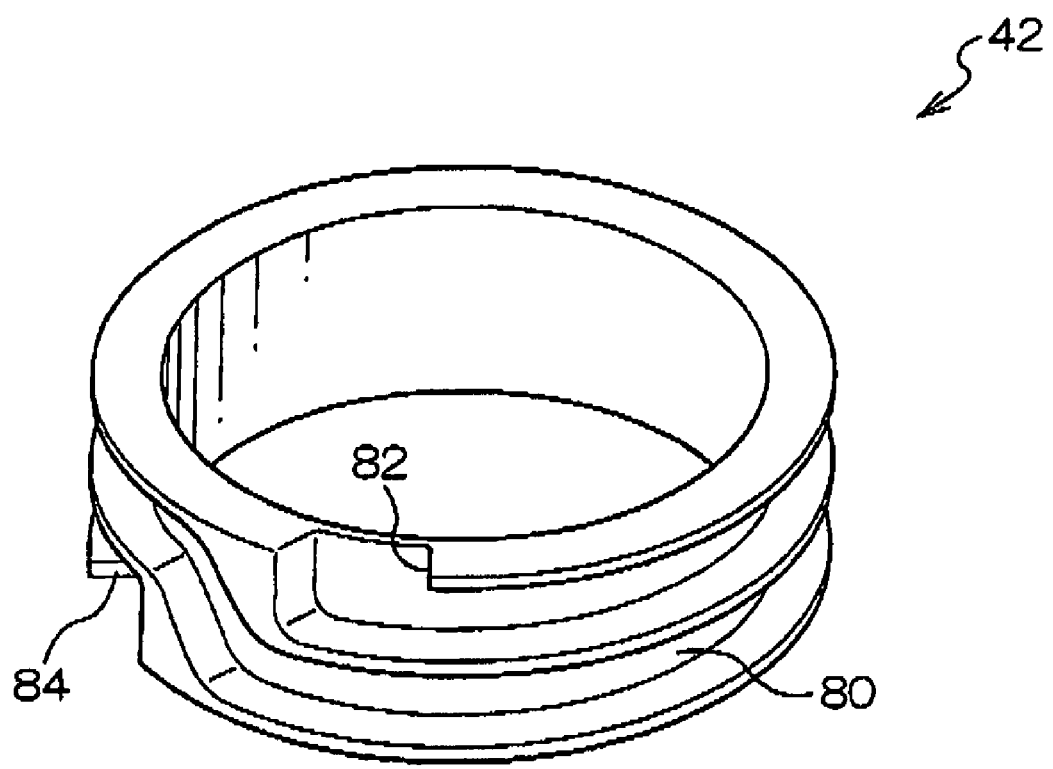
FIG. 2 is a perspective view showing a structure of a second partition member in the vibration proofing apparatus shown in FIG. 1.

FIG. 1 shows a vibration proofing apparatus in accordance with a first embodiment of the present invention. The vibration proofing apparatus 10 is used, for example, as an engine mount in a motor vehicle, and supports an engine as a vibration generating portion on a vehicle body corresponding to a vibration receiving portion. In this case, reference symbol S denotes an axis center of the apparatus, and a description will be given below by setting a direction along the axis center S to an axial direction of the apparatus, and a direction orthogonal to the axis center S to a diametrical direction of the apparatus.

As shown in FIG. 1, the vibration proofing apparatus 10 is provided with an apparatus main body 12 formed in an approximately columnar shape, and a bracket 14 for coupling and fixing the apparatus main body 12 to a vehicle body side. In the bracket 14, there is formed a cylindrical holder portion 16, and there is integrally formed a pair of leg portions 18 extending in the diametrical direction from a lower end portion of the holder portion 16. A vehicle body coupling mounting hole 19 passes through a leading end portion of each of a pair of leg portions 18 in the axial direction. Further, a step portion 20 bent in an inner peripheral side is integrally formed in a lower end portion of the holder portion 16.

The apparatus main body 12 is provided with a thin cylindrical outer tube 24 in which both end portions in the axial direction are open to an outer peripheral side thereof, and a mounting attachment 26 formed in the approximately columnar shape is coaxially arranged in an inner peripheral side of the outer tube 24. A step portion 28 is formed in a lower end portion of the outer tube 24 so as to be bent to an inner peripheral side, and a small-diameter portion 30 formed in a smaller-diameter cylindrical shape than an upper portion side is integrally formed via the step portion 28. The outer tube 24 is fitted and inserted into the holder portion 16 in such a manner that the step portion 28 is abutted against the step portion 20 of the holder portion 16. At this time, since a whole or a portion near an upper end portion of the holder portion 16 is caulked to an inner peripheral side near the upper end portion, the apparatus main body 12 including the outer tube 24 is fixed to a predetermined position within the bracket 14 at a sufficient strength.

In this case, at a time of coupling the vibration proofing apparatus 10 to the vehicle body side, the vibration proofing apparatus 10 is fastened and fixed to the vehicle body side via the bracket 14 by inserting a bolt (not shown) to each of the mounting holes 19 of a pair of leg portions 18, and screwing a leading end portion into a bolt hole provided in the vehicle body side. Further, a bolt shaft 32 protruding to an upper side along the shaft center S is provided in a rising manner in an upper surface portion of the mounting attachment 26, and the mounting attachment 26 is coupled and fixed to the engine side via the bolt shaft 32.

A rubber coating portion 34 formed in a thin film shape on an inner peripheral surface of the outer tube 24 is vulcanization adhered to the vibration proofing apparatus 10, and a rubber diaphragm 36 is integrally in such a manner as to close a lower end portion within a small-diameter portion 30. The diaphragm 36 is formed in a bowl shape curved in a convex shape toward an upper side, and is elastically deformable along the axial direction in such a manner as to expand and contract an internal volume of an auxiliary liquid chamber 72 mentioned below in correspondence to a pressure change of a liquid filled within the auxiliary liquid chamber 72.

A spacer member 38, a first partition member 40, a second partition member 42 and an intermediate tube 44 are respectively fitted and inserted to the inner peripheral side of the outer tube 24, in the vibration proofing apparatus 10 in the order from a lower end side toward an upper end side. Further, the vibration proofing apparatus 10 is provided with a rubber elastic body 22 between the intermediate tube 44 and the mounting attachment 26. The rubber elastic body 22 is formed in a thick cylindrical shape as a whole, and an inner peripheral surface and an outer peripheral surface thereof are respectively vulcanization adhered to an inner peripheral surface of the internal tube 44 and an outer peripheral surface of the mounting attachment 26. Accordingly, the mounting attachment 26 and the intermediate tube 44 are elastically coupled by the rubber elastic body 22.

The spacer member 38 is formed in a cylindrical shape having an outer diameter corresponding to an inner diameter of the outer tube 24, and is fitted and inserted to the inner peripheral side of the outer tube 24 via the coating portion 34, and a lower end portion thereof is struck against the step portion 28. A first partition member 40 is fitted and inserted into the outer tube 24 in an upper side of the space member 38. The first partition member 40 is formed in a disc shape which is formed thicker in an inner peripheral side than an outer peripheral side, and a flange-shaped extending portion 50 extending to an outer peripheral side is integrally formed in a lower end portion of an outer peripheral surface thereof. An inner peripheral side of the first partition member 40 is formed as an orifice forming portion 52, and an annular groove portion 54 is formed in an upper surface portion of the orifice forming portion 52 near one circle along a peripheral direction centering on the axis center S. A communication hole 56 penetrating to a lower surface of the orifice forming portion 52 is pierced in one end portion of the groove portion 54.

In the orifice forming portion 52, a circular concave portion 58 is formed in an inner peripheral side of the groove portion 54, and a plurality of opening portions 60 penetrating to the lower surface of the orifice forming portion 52 is formed in a bottom plate portion of the concave portion 58. The first partition member 40 is provided with a disc-shaped closing plate 62 firmly attached to the upper surface portion of the orifice forming portion 52, and the closing plate 62 is firmly attached to the orifice forming portion 52 in accordance with an adhesion, a screwing or the like, in such a manner as to close from the groove portion 54 and the upper surface side of a storage chamber 70. Further, a communication hole 64 is pierced at a position opposing to the other end portion of the groove portion 54 in the closing plate 62, and a plurality of opening portions 65 are formed at a position opposing to the concave portion 58.

In this case, the communication hole 56 in the orifice forming portion 52 and the communication hole 64 of the groove portion 54 and the closing plate 62 form a first orifice 66 corresponding to a limit passage communicating a first pressure receiving liquid chamber 76 and an auxiliary liquid chamber 72 mentioned below. Further, the concave portion 58 of the orifice forming portion 52 in which the upper surface side is closed by the closing plate 62 is structured as the storage chamber 70 storing a rubber movable plate 68. The movable plate 68 is formed in a disc shape having a fixed thickness, a thickness of the movable plate 68 is made shorter at a predetermined length than a thickness along the axial direction of the storage chamber 70, and an outer diameter thereof is made slightly shorter than an inner diameter of the storage chamber 70. Accordingly, the movable plate 68 can be moved (vibrated) along the axial direction within a range of a difference between the thickness of the movable plate and the thickness of the storage chamber 70.

The first partition member 40 is fitted and inserted into the outer tube 24 in such a manner that the lower surface outer peripheral portion of the extending portion 50 is abutted against an upper end portion of the spacer member 38. Accordingly, a space comparted by the diaphragm 36 and the first partition member 40 from the outer portion is formed in the lower portion side within the outer tube 24, and the space is formed as an auxiliary liquid chamber 72 filled with a liquid such as an ethylene glycol, a silicone oil or the like.

On the other hand, a concave portion 74 in which a cross section along an axial perpendicular direction is formed as a circular shape is formed in a center portion of the lower surface of the rubber elastic body 22, and an orifice forming portion 52 is inserted into the concave portion 74 from a lower surface side. Further, the extending portion 50 of the first partition member 40 is pressure contacted with a peripheral edge portion of the concave portion 58 in the lower surface of the rubber elastic body 22. Accordingly, the first partition member 40 forms a space which closes the lower surface side within the concave portion 74 and is comparted within the concave portion 74 from outer portion. This space is formed as a first pressure receiving liquid chamber 76 filled with the liquid such as the ethylene glycol, the silicone oil or the like. The first pressure receiving liquid chamber 76 and the auxiliary liquid chamber 72 are communicated with each other by the first orifice 66, and the liquid can be circulated with each other between the first pressure receiving liquid chamber 76 and the auxiliary liquid chamber 72 through the first orifice 66.

In this case, as a vibration (a main vibration) in a vertical direction generated by the engine in the vehicle corresponding to a vibration source, there is known a shake vibration having a comparatively low frequency (for example, 8 to 15 Hz), however, classifying the shake vibration more minutely, the shake vibration can be classified into an engine bounds vibration (hereinafter, refer simply to as "bounds vibration") having a frequency lower than 10 Hz, and a pitching vibration having a frequency between 10 Hz and 15 Hz. In the vibration proofing apparatus 10 in accordance with the present embodiment, a path length and a cross sectional area of the first orifice 66 communicating the first pressure receiving liquid chamber 76 and the auxiliary liquid chamber 72 are set (tuned) in such a manner as to correspond to the frequency (lower than 10 Hz) of the bounds vibration.

Within the outer tube 24, the second partition member 42 is fitted and inserted to an upper side of the extending portion 50 of the first partition member 40. As shown in FIGS. 2 and 3A to 3C, the second partition member 42 is formed in a thick cylindrical shape, and an outer diameter thereof is set to a dimension corresponding to the inner diameter of the outer tube 24. The second partition member 42 fitted and inserted into the outer tube 24 is abutted against the upper surface side of the extending portion 50 in the lower surface portion thereof, and is pressure contacted with the inner peripheral surface of the outer tube 24 in the outer peripheral surface via the coating portion 34.

Figure 3A:
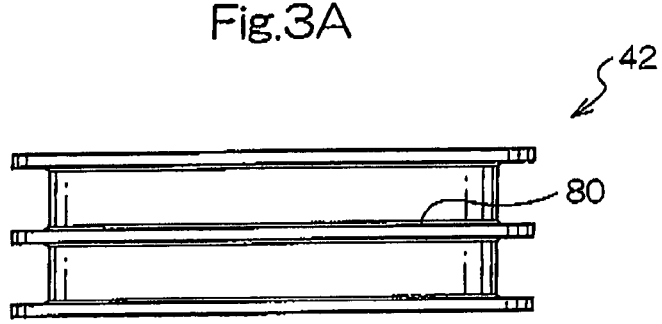
FIG. 3A is a side view in an opposite side to a communication port of the second partition member shown in FIG. 1.
Figure 3B:
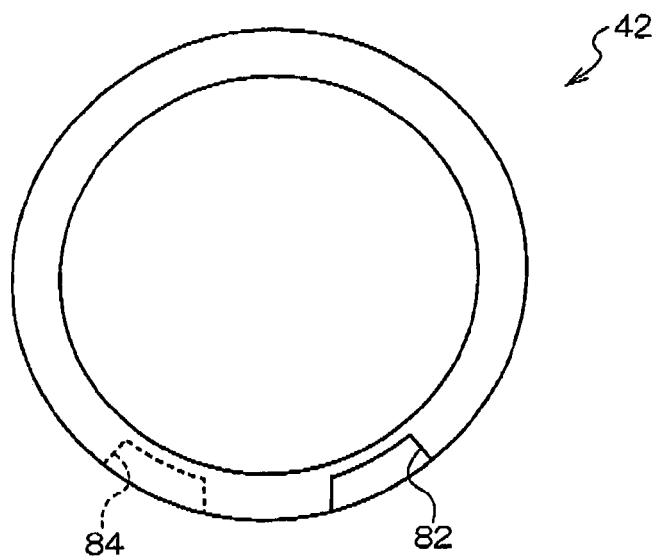
FIG. 3B is a plan view of the second partition member shown in FIG. 1.
Figure 3C:
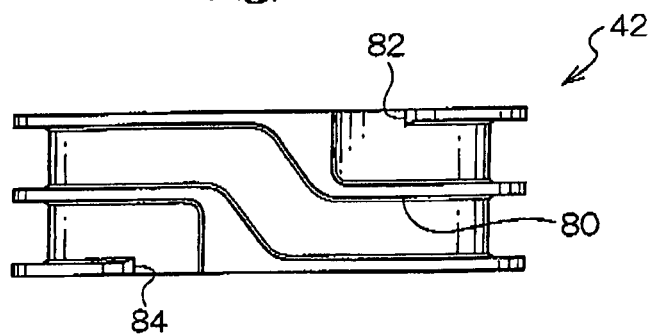
FIG. 3C is a side view in a communication port side of the second partition member shown in FIG. 1.

An outer peripheral groove 80 extending in a spiral shape is formed on an outer peripheral surface of the second partition member 42, and the outer peripheral groove 80 goes around the outer peripheral surface of the second partition member 42 near two circles, as shown in FIGS. 3A and 3C. Further, in the second partition member 42, as shown in FIGS. 3B and 3C, there are formed an upper communication port 82 penetrating to an upper side from one end portion of the outer peripheral groove 80, and a lower communication port 84 penetrating to a lower side from the other end portion of the outer peripheral groove 80. Further, in the extension portion 50 of the first partition member 40, as shown in FIG. 1, there is formed a lower notch portion 86 at a position opposing to the lower communication port 84 from an outer peripheral end toward an inner peripheral side, and the lower notch portion 86 communicates the lower communication port 84 with the auxiliary liquid chamber 72.

As shown in FIG. 1, a cylindrical large-diameter portion 88 having a large diameter is formed in an upper portion side of the intermediate tube 44, and a cylindrical small-diameter portion 92 having a smaller diameter than the large-diameter portion 88 is integrally formed therein via a step portion 90 extending to an inner peripheral side from a lower end portion of the large-diameter portion 88. In this case, the large-diameter portion 88 has an outer diameter corresponding to the inner diameter of the outer tube 24, and the small-diameter portion 92 has an outer diameter corresponding to the inner diameter of the second partition member 42. The intermediate tube 44 brings the outer peripheral surface of the small-diameter portion 92 to abut against the inner peripheral surface of the second partition member 42, and pressure contacts the outer peripheral surface of the large-diameter portion 88 with the upper end portion of the inner peripheral surface of the outer tube 24 via the coating portion 34. Further, the intermediate tube 44 brings the step portion 90 to abut against the upper surface portion of the second partition member 42. Accordingly, a movement in the axial direction of the second partition member 42 is constrained between the step portion 90 and the extending portion 50 of the first partition member 40. Further, an upper notch portion 94 is formed at a position opposing to the upper communication port 82 of the second partition member 42 from the outer peripheral end toward the inner peripheral side, in the step portion 90.

Figure 4:
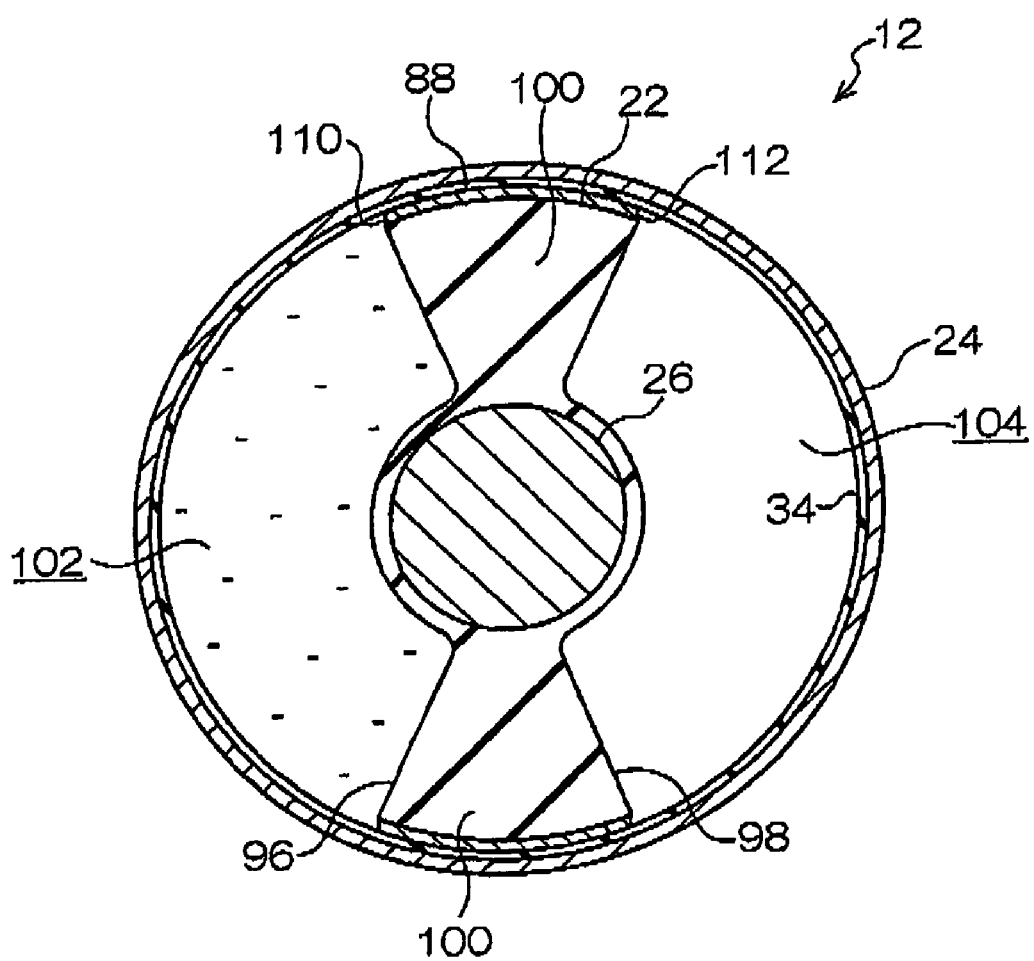
FIG. 4 is a cross sectional view along a cut line IV-IV of a main body of the apparatus shown in FIG. 1.

In the intermediate tube 44, a first cavity portion 96 and a second cavity portion 98 each formed in a concave shape from an outer peripheral surface toward an inner peripheral side are formed in one end portion and the other end portion along the diametrical direction, in the portion in an inner peripheral side of the large-diameter portion 88. These cavity portions 96 and 98 are formed in an approximately semicircular shape in a cross sectional shape along the axial direction. Further, the cavity portions 96 and 98 are formed in an approximately fan shape in which a cross sectional shape along the diametrical direction is wide toward an outer peripheral side from an inner peripheral side, as shown in FIG. 4, and in the rubber elastic body 22, there is formed a partition wall portion 100 having an approximately fan-shaped cross section which is wide toward an outer peripheral side from an inner peripheral side, between the first cavity portion 96 and the second cavity portion 98. Further, in the large-diameter portion 88 of the intermediate tube 44, as shown in FIG. 1, there is formed a first opening portion 110 and a second opening portion 112 which respectively face to the first cavity portion 96 and the second cavity portion 98 and are formed in an approximately rectangular shape elongated in a peripheral direction.

Each of the first cavity portion 96 and the second cavity portion 98 is closed in an outer peripheral side by the inner peripheral surface of the outer tube 24 via the coating portion 34. Accordingly, a space comparted from the outer portion is formed within the first cavity portion 96 and the second cavity portion 98, and the space within the first cavity portion 96 is formed as a second pressure receiving liquid chamber 102 filled with the liquid such as the ethylene glycol, the silicone oil or the like. Further, the space within the second cavity portion 98 is formed as an air chamber 104 communicated with the outer portion of the apparatus through an air hole 106 pierced in the rubber elastic body 22.

In this case, the outer peripheral groove 80 of the second partition member 42 is closed in the outer peripheral side by the inner peripheral surface of the outer tube 24 via the coating portion 34. The outer peripheral groove 80 closed in the outer peripheral side composes a second orifice 108 communicating the auxiliary liquid chamber 72 and the second pressure receiving liquid chamber 102 with each other together with the upper notch portion 94 of the intermediate tube 44, the communication holes 56 and 64 of the second partition member 42 and the lower notch portion 86 of the first partition member 40. The second orifice 108 can circulate the liquid between the second pressure receiving liquid chamber 102 and the auxiliary liquid chamber 72.

In the vibration proofing apparatus 10 in accordance with the present embodiment, a path length and a cross sectional area of the second orifice 108 communicating the second pressure receiving liquid chamber 102 and the auxiliary liquid chamber 72 are set (tuned) in such a manner as to correspond to the frequency (10 Hz to 15 Hz) of the pitching vibration with respect to the vibration along the main amplitude direction, and set (tuned) in such a manner as to correspond to a specific frequency selected from the frequency range between 5 Hz and 20 Hz with respect to the vibration along the auxiliary amplitude direction.

As shown in FIG. 1, a partition wall portion 114 comparting the second pressure receiving liquid chamber 102 from the space in the outer portion of the apparatus is integrally formed in the upper end portion, in the rubber elastic body 22. The inner peripheral side end portion of the partition wall portion 114 is vulcanization adhered to the outer peripheral surface of the mounting attachment 26, and the outer peripheral side end portion is vulcanization adhered to the inner peripheral surface of the intermediate tube 44. A cross sectional shape along the diametrical direction of the partition wall portion 114 is formed in a curved shape bulging in a convex shape toward the space in the outer portion of the apparatus.

Further, in the vibration proofing apparatus 10, if the rubber elastic body 22 is elastically deformed in a direction (a second volume expanding and contracting direction) in which the second pressure receiving liquid chamber 102 and the air chamber 104 are aligned, via the mounting attachment 26 in the diametrical direction, each of the internal volumes of the second pressure receiving liquid chamber 102 and the air chamber 104 is expanded and contracted. In this case, in the rubber elastic body 22, a thickness or the like of the partition wall portion of the second pressure receiving liquid chamber 102 and the air chamber 104 is adjusted in such a manner as to make a rigidity against an input load toward the second pressure receiving liquid chamber 102 side along the second volume expanding and contracting direction approximately equal to a rigidity against an input load toward the air chamber 104 side. In this case, a mounting direction of the vibration proofing apparatus 10 in accordance with the present embodiment is adjusted in such a manner that the second volume expanding and contracting direction substantially coincides with an auxiliary amplitude direction mentioned below, in a state of being installed to the vehicle.

In the vibration proofing apparatus 10, if the mounting attachment 26 coupled by the space member 38, the first partition member 40, the second partition member 42 and the rubber elastic body 22, and the intermediate tube 44 are fitted and inserted to a predetermined position within the outer tube 24, the space member 38, the first partition member 40, the second partition member 42 and the intermediate tube 44 are fixed to the outer tube 24 by caulking a whole of the outer tube 24 to an inner peripheral side. Accordingly, an assembly of the apparatus main body 12 is completed, and the apparatus main body 12 is fitted and inserted into the holder portion 16 of the bracket 14 as mentioned above, and is fixed by caulking.

Next, a description will be given of an operation of the vibration proofing apparatus 10 in accordance with the present embodiment structured as mentioned above. In the vibration proofing apparatus 10, if the engine coupled to the mounting attachment 26 is actuated, the vibration from the engine is transmitted to the rubber elastic body 22 via the mounting attachment 26. At this time, the rubber elastic body 22 operates as a vibration absorbing main body, and the input vibration is absorbed due to an attenuation operation by an internal friction or the like generated in accordance with the deformation of the rubber elastic body 22.

At this time, as a main vibration input to the vibration proofing apparatus 10 from the engine, there are listed up a vibration (a main vibration) generated due to a reciprocation within the cylinder of the piston within the engine, and a vibration (an auxiliary vibration) generated due to a change or a rotating speed of the crank shaft within the engine. In the case that the engine is of an inline type, an amplitude direction (a main amplitude direction) of the main vibration approximately coincides with a vertical direction of the vehicle, and an amplitude direction (an auxiliary amplitude direction) of the auxiliary vibration approximately coincides with a longitudinal direction of the vehicle orthogonal to the amplitude direction of the main vibration (in the case that the engine is arranged horizontally) or a lateral direction (in the case that the engine is arranged vertically). The rubber elastic body 22 can absorb the input vibration due to the attenuation operation generated by the internal friction or the like, whichever the input vibration is constituted by the main vibration along the main amplitude direction, or the auxiliary vibration along the auxiliary amplitude direction.

Further, in the vibration proofing apparatus 10, since the first pressure receiving liquid chamber 76 is arranged in the lower side in the axial direction of the mounting attachment 26, in the inner peripheral side of the outer tube 24, and the first pressure receiving liquid chamber 76 is communicated with the auxiliary liquid chamber 72 through the first orifice 66, the rubber elastic body 22 is elastically deformed along the main amplitude direction, and the internal volume of the first pressure receiving liquid chamber 76 is expanded or contracted, if the main vibration along the main amplitude direction is input to the mounting attachment 26 from the engine side. Accordingly, the liquid circulates in the first pressure receiving liquid chamber 76 and the auxiliary liquid chamber 72 with each other through the first orifice 66.

At this time, since the path length and the cross sectional area in the first orifice 66 are set in such a manner as to correspond to the frequency of the bounds vibration, a resonance phenomenon (a liquid column resonance) is generated in the liquid circulating between the first pressure receiving liquid chamber 76 and the auxiliary liquid chamber 72 through the first orifice 66 mutually in synchronization with the input vibration in the case that the input main vibration is constituted by the bounds vibration. Therefore, it is possible to particularly effectively absorb the bounds vibration input along the main amplitude direction due to the pressure change and the viscous resistance of the liquid caused by the liquid column resonance.

Further, in the vibration proofing apparatus 10, in the case that the frequency of the input main vibration is higher than the frequency of the shake vibration, and the amplitude thereof is small, for example, in the case that the input vibration is constituted by the idling vibration (for example, 20 to 30 Hz), and the amplitude is about 0.1 mm to 0.2 mm, the first orifice 66 tuned in such a manner as to correspond to the shake vibration is in a clogged state, and the liquid is hard to flow through tie first orifice 66. However, since the movable plate 68 is vibrated within the storage chamber 70 along the axial direction in synchronization with the input vibration, the liquid circulates between the first pressure receiving liquid chamber 76 and the auxiliary liquid chamber 72 through the gap between the inner wall surface of the storage chamber 70 and the movable plate 68, and the opening portions 60 and 65. Therefore, it is possible to suppress an ascent of a dynamic spring constant in accordance with an ascent of a liquid pressure within the first pressure receiving liquid chamber 76, it is possible to maintain the dynamic spring constant of the rubber elastic body 22 low even at a time of inputting the high-frequency vibration mentioned above, and it is possible to effectively absorb the high-frequency vibration due to the elastic deformation of the rubber elastic body 22 or the like.

Further, in the vibration proofing apparatus 10, since the second pressure receiving liquid chamber 102 is arranged between the outer tube 24 and the mounting attachment 26, and the second pressure receiving liquid chamber 102 is communicated with the auxiliary liquid chamber 72 through the second orifice 108, the rubber elastic body 22 is elastically deformed along the auxiliary amplitude direction and expands and contracts the internal volume of the second pressure receiving liquid chamber 102 in the case that the auxiliary vibration along the auxiliary amplitude direction is input to the mounting attachment 26 from the engine side. Therefore, the liquid circulates in the second pressure receiving liquid chamber 102 and the auxiliary liquid chamber 72 mutually through the second orifice 108.

In this case, since the path length and the cross sectional area in the second orifice 108 are set in such a manner as to correspond to the specific frequency selected from 5 Hz to 20 Hz with respect to the vibration along the auxiliary amplitude direction, the resonance phenomenon is generated in the liquid circulating between the second pressure receiving liquid chamber 102 and the auxiliary liquid chamber 72 mutually through the second orifice 108, in the case that the input auxiliary vibration has the specific frequency. Therefore, it is possible to effectively absorb the vibration having the specific frequency input along the auxiliary amplitude direction due to the pressure change, the viscous resistance or the like in accordance with the resonance phenomenon of the liquid.

Further, the second pressure receiving liquid chamber 102 is arranged between the outer tube 24 and the mounting attachment 26, in the vibration proofing apparatus 10, however, if the rubber elastic body 22 is elastically deformed at a time of inputting the vibration along the main amplitude direction, the second pressure receiving liquid chamber 102 is deformed in accordance with the elastic deformation of the rubber elastic body 22, and the internal volume of the second pressure receiving liquid chamber 102 is increased and decreased. The change amount of the internal volume generated in the second pressure receiving liquid chamber 102 at this time is significantly smaller as compared with the change amount of the internal volume of the first pressure receiving liquid chamber 76, however, the change of the internal volume corresponding to the change amount of the rubber elastic body 22 is securely generated in the second pressure receiving liquid chamber 102.

Accordingly, in the vibration proofing apparatus 10, the rubber elastic body 22 is elastically deformed along the main amplitude direction, and the internal volume of the second pressure receiving liquid chamber 102 is expanded and contracted, even in the case that the main vibration along the main amplitude direction is input to the mounting attachment 26 from the engine side. Therefore, there is generated a phenomenon that the liquid circulates in the second pressure receiving liquid chamber 102 and the auxiliary liquid chamber 72 mutually through the second orifice 108.

At this time, since the path length and the cross sectional area in the second orifice 108 are set in such a manner as to correspond to the frequency of the pitching vibration with respect to the vibration along the main amplitude direction, the resonance phenomenon is generated in the liquid circulating between the second pressure receiving liquid chamber 102 and the auxiliary liquid chamber 72 mutually through the second orifice 108, in the case that the input auxiliary vibration has the frequency of the pitching vibration. Therefore, it is possible to particularly effectively absorb the pitching vibration input along the main amplitude direction due to the pressure change, the viscous resistance or the like in accordance with the resonance phenomenon of the liquid.

Further, in the vibration proofing apparatus 10, since the second pressure receiving liquid chamber 102 and the auxiliary liquid chamber 72 are comparted in the inner peripheral side of the outer tube 24, and the second partition member 42 in which the second orifice 108 is formed is arranged, it is possible to make the interval between the second pressure receiving liquid chamber 102 and the auxiliary liquid chamber 72 sufficiently wide, and it is possible to make the path length of the second orifice 108 provided in the second partition member 42 in such a manner as to communicate the second pressure receiving liquid chamber 102 with the auxiliary liquid chamber 72 sufficiently long. Accordingly, since it is possible to easily tune the path length of the second orifice 108 so as to correspond to the low frequency equal to or less than 10 Hz, as compared with the conventional case that a plurality of liquid chambers each having the rubber elastic body as a part of the inner wall are provide, and the orifice communicating these liquid chambers is formed in the rubber elastic body, it is possible to effectively attenuate and absorb the auxiliary vibration having the low frequency by tuning the path length or the like of the second orifice 108 in correspondence to the auxiliary vibration having the low frequency mentioned above, even in the case that the auxiliary vibration input along the auxiliary amplitude direction has the low frequency.

Further, in the vibration proofing apparatus 10, since the thickness or the like of the partition wall portion of the second pressure receiving liquid chamber 102 and the air chamber 104 is adjusted in such a manner that the rigidity become approximately uniform between the input load toward the second pressure receiving liquid chamber 102 side along the auxiliary amplitude direction in the rubber elastic body 22 and the input load toward the air chamber 104 side, it is possible to make a relative displacement amount at which the mounting attachment 26 moves toward the second pressure receiving liquid chamber 102 side along the auxiliary amplitude direction at a time of inputting the auxiliary vibration approximately equal to a relative displacement amount at which the mounting attachment 26 moves toward the air chamber 104 side. Accordingly, it is possible to prevent the displacement of the engine generating the auxiliary vibration from becoming excessively large to any one of the second pressure receiving liquid chamber 102 and the air chamber 104 side.

In this case, in the vibration proofing apparatus 10 in accordance with the present embodiment, the outer tube 24 is coupled to the vehicle body side via the bracket 14, and the mounting attachment 26 is coupled to the engine side, however, the structure may be inversely made such that the outer tube 24 is coupled to the engine side, and the mounting attachment 26 is coupled to the vehicle body side.

(Second Embodiment)

Next, a description will be given of a vibration proofing apparatus in accordance with a second embodiment of the present invention.

Figure 5:
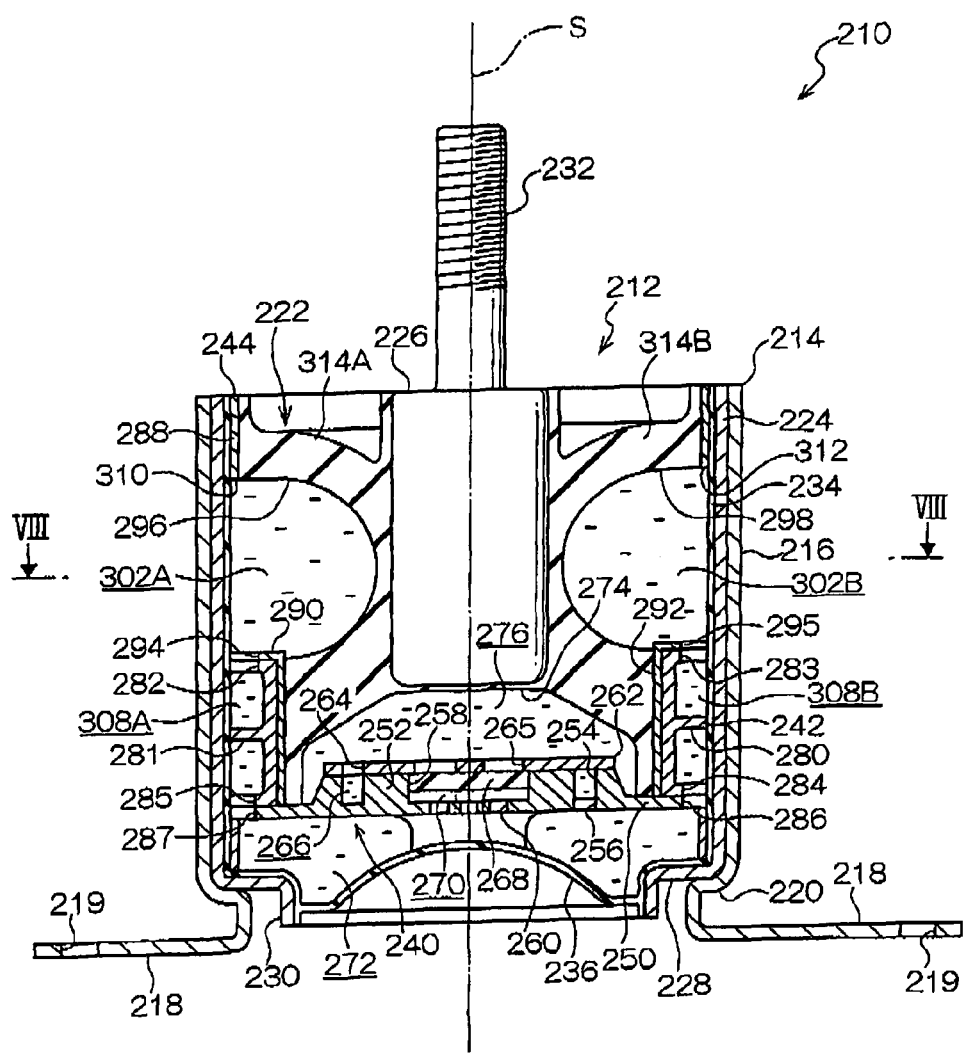
FIG. 5 is a side cross sectional view showing a structure of a vibration proofing apparatus in accordance with a second embodiment of the present invention.

FIG. 5 shows a vibration proofing apparatus in accordance with a second embodiment of the present invention. The vibration proofing apparatus 210 is used, for example, as an engine mount in a motor vehicle, and supports an engine as a vibration generating portion on a vehicle body corresponding to a vibration receiving portion. In this case, reference symbol S denotes a shaft center of the apparatus, and a description will be given below by setting a direction along the shaft center S to an axial direction of the apparatus, and a direction orthogonal to the shaft center S to a diametrical direction of the apparatus.

As shown in FIG. 5, the vibration proofing apparatus 210 is provided with an apparatus main body 212 formed in an approximately columnar shape, and a bracket 214 for coupling and fixing the apparatus main body 212 to a vehicle body side. In the bracket 214, there is formed a cylindrical holder portion 216, and there is integrally formed a pair of leg portions 218 extending in the diametrical direction from a lower end portion of the holder portion 216. A vehicle body coupling mounting hole 219 passes through a leading end portion of each of a pair of leg portions 218 in the axial direction. Further, a step portion 220 bent in an inner peripheral side is integrally formed in a lower end portion of the holder portion 216.

The apparatus main body 212 is provided with a than cylindrical outer tube 224 in which both end portions in the axial direction are open to an outer peripheral side thereof, and a mounting attachment 226 formed in the approximately columnar shape is coaxially arranged in an inner peripheral side of the outer tube 224. A step portion 228 is formed in a lower end portion of the outer tube 224 so as to be bent to an inner peripheral side, and a small-diameter portion 230 formed in a smaller-diameter cylindrical shape than an upper portion side is integrally formed via the step portion 228. The outer tube 224 is fitted and inserted into the holder portion 216 in such a manner that the step portion 228 is abutted against the step portion 220 of the holder portion 216. At this time, since a whole or a portion near an upper end portion of holder portion is caulked to an inner peripheral side near the upper end portion, the apparatus main body 212 including the outer tube 224 is fixed to a predetermined position within the bracket 214 at a sufficient strength.

In this case, at a time of coupling the vibration proofing apparatus 210 to the vehicle body side, the vibration proofing apparatus 210 is fastened and fixed to the vehicle body side via the bracket 214 by inserting a bolt (not shown) to each of the mounting holes 219 of a pair of leg portions 218, and screwing a leading end portion into a bolt hole provided in the vehicle body side. Further, a bolt shaft 232 protruding to an upper side along the shaft center S is provided in a rising manner in an upper surface portion of the mounting attachment 226, and the mounting attachment 226 is coupled and fixed to the engine side via the bolt shaft 232.

A rubber coating portion 234 formed in a thin film shape on an inner peripheral surface of the outer tube 224 is vulcanization adhered to the vibration proofing apparatus 210, and a rubber diaphragm 236 is integrally in such a manner as to close a lower end portion within a small-diameter portion 230. The diaphragm 236 is formed in a bowl shape curved in a convex shape toward an upper side, and is elastically deformable along the axial direction in such a manner as to expand and contract an internal volume of an auxiliary liquid chamber 272 mentioned below in correspondence to a pressure change of a liquid filled within the auxiliary liquid chamber 272.

A spacer member 238, a first partition member 240, a second partition member 242 and an intermediate tube 244 are respectively fitted and inserted to the inner peripheral side of the outer tube 224, in the vibration proofing apparatus 210 in the order from a lower end side toward an upper end side. Further, the vibration proofing apparatus 210 is provided with a rubber elastic body 222 between the intermediate tube 244 and the mounting attachment 226. The rubber elastic body 222 is formed in a thick cylindrical shape as a whole, and an inner peripheral surface and an outer peripheral surface thereof are respectively vulcanization adhered to an inner peripheral surface of the internal tube 244 and an outer peripheral surface of the mounting attachment 226. Accordingly, the mounting attachment 226 and the intermediate tube 244 are elastically coupled by the rubber elastic body 222.

The spacer member 238 is formed in a cylindrical shape having an outer diameter corresponding to an inner diameter of the outer tube 224, and is fitted and inserted to the inner peripheral side of the outer tube 224 via the coating portion 234, and a lower end portion thereof is struck against the step portion 228. A first partition member 240 is fitted and inserted into the outer tube 224 in an upper side of the space member 238. The first partition member 240 is formed in a disc shape, which is formed thicker in an inner peripheral side than an outer peripheral side, and a flange-shaped extending portion 250 extending to an outer peripheral side, is integrally formed in a lower end portion of an outer peripheral surface thereof. An inner peripheral side of the first partition member 240 is formed as an orifice forming portion 252, and an annular groove portion 254 is formed in an upper surface portion of the orifice forming portion 252 near one circle along a peripheral direction centering on the shaft center S. A communication hole 256 penetrating to a lower surface of the orifice forming portion 252 is pierced in one end portion of the groove portion 254.

In the orifice forming portion 252, a circular concave portion 258 is formed in an inner peripheral side of the groove portion 254, and a plurality of opening portions 260 penetrating to the lower surface of the orifice forming portion 252 is formed in a bottom plate portion of the concave portion 258. The first partition member 240 is provided with a disc-shaped closing plate 262 firmly attached to the upper surface portion of the orifice forming portion 252, and the closing plate 262 is firmly attached to the orifice forming portion 252 in accordance with an adhesion, a screwing or the like, in such a manner as to close from the groove portion 254 and the upper surface side of a storage chamber 270. Further, a communication hole 264 is pierced at a position opposing to the other end portion of the groove portion 254 in the closing plate 262, and a plurality of opening portions 265 are formed at a position opposing to the concave portion 258.

In this case, the communication hole 256 in the orifice forming portion 252 and the communication hole 264 of the groove portion 254 and the closing plate 262 form a first orifice 266 corresponding to a limit passage communicating a first pressure receiving liquid chamber 276 and an auxiliary liquid chamber 272 mentioned below. Further, the concave portion 258 of the orifice forming portion 252 in which the upper surface side is closed by the closing plate 262 is structured as the storage chamber 270 storing a rubber movable plate 268. The movable plate 268 is formed in a disc shape having a fixed thickness, a thickness of the movable plate 268 is made shorter at a predetermined length than a thickness along the axial direction of the storage chamber 270, and an outer diameter thereof is made slightly shorter than an inner diameter of the storage chamber 270. Accordingly, the movable plate 268 can be moved (vibrated) along the axial direction within a range of a difference between the thickness of the movable plate and the thickness of the storage chamber 270.

The first partition member 240 is fitted and inserted into the outer tube 224 in such a manner that the lower surface outer peripheral portion of the extending portion 250 is abutted against an upper end portion of the spacer member 238. Accordingly, a space comparted by the diaphragm 236 and the first partition member 240 from the outer portion is formed in the lower portion side within the outer tube 224, and the space is formed as an auxiliary liquid chamber 272 filled with a liquid such as an ethylene glycol, a silicone oil or the like.

On the other hand, an approximately frustoconical-shaped concave portion 274 in which a cross section along an axial perpendicular direction is formed as a circular shape is formed in a center portion of the lower surface of the rubber elastic body 222, and an orifice forming portion 252 is inserted into the concave portion 274 from a lower surface side. Further, the extending portion 250 of the first partition member 240 is pressure contacted with a peripheral edge portion of the concave portion 258 in the lower surface of the rubber elastic body 222. Accordingly, the first partition member 240 forms a space which closes the lower surface side within the concave portion 274 and is comparted within the concave portion 274 from outer portion. This space is formed as a first pressure receiving liquid chamber 276 filled with the liquid such as the ethylene glycol, the silicone oil or the like. The first pressure receiving liquid chamber 276 and the auxiliary liquid chamber 272 are communicated with each other by the first orifice 266, and the liquid can be circulated with each other between the first pressure receiving liquid chamber 276 and the auxiliary liquid chamber 272 through the first orifice 266.

In this case, as a vibration (a main vibration) in a vertical direction generated by the engine in the vehicle corresponding to a vibration source, there is known a shake vibration having a comparatively low frequency (for example, 8 to 15 Hz), however, classifying the shake vibration more minutely, the shake vibration can be classified into an engine bounds vibration (hereinafter, simply referred to as "bounds vibration") having a frequency lower than 10 Hz, and a pitching vibration having a frequency between 10 Hz and 15 Hz. In the vibration proofing apparatus 210 in accordance with the present embodiment, a path length and a cross sectional area of the first orifice 266 communicating the first pressure receiving liquid chamber 276 and the auxiliary liquid chamber 272 are set (tuned) in such a manner as to correspond to the frequency (lower than 10 Hz) of the bounds vibration.

Figure 6:
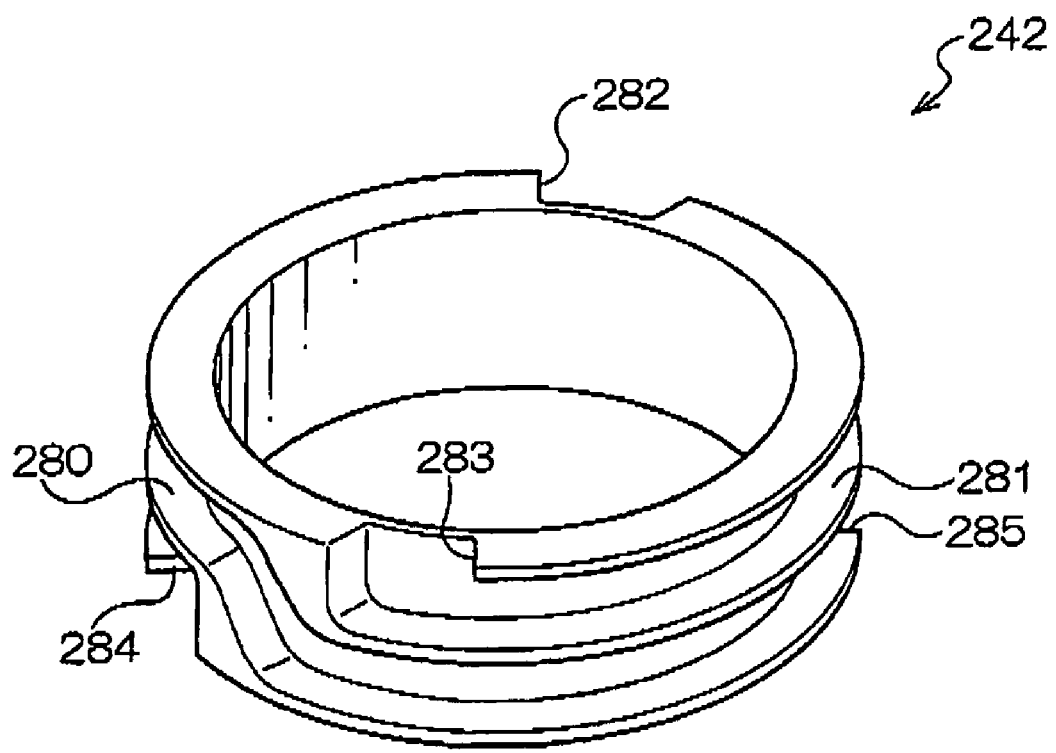
FIG. 6 is a perspective view showing a structure of a second partition member in the vibration proofing apparatus shown in FIG. 5.

Within the outer tube 224, the second partition member 242 is fitted and inserted to an upper side of the extending portion 250 of the first partition member 240. As shown in FIG. 6, the second partition member 242 is formed in a thick cylindrical shape, and an outer diameter thereof is set to a dimension corresponding to the inner diameter of the outer tube 224. The second partition member 242 fitted and inserted into the outer tube 224 is abutted against the upper surface side of the extending portion 250 in the lower surface portion thereof, and is pressure contacted with the inner peripheral surface of the outer tube 224 in the outer peripheral surface via the coating portion 234.

Figure 7A:
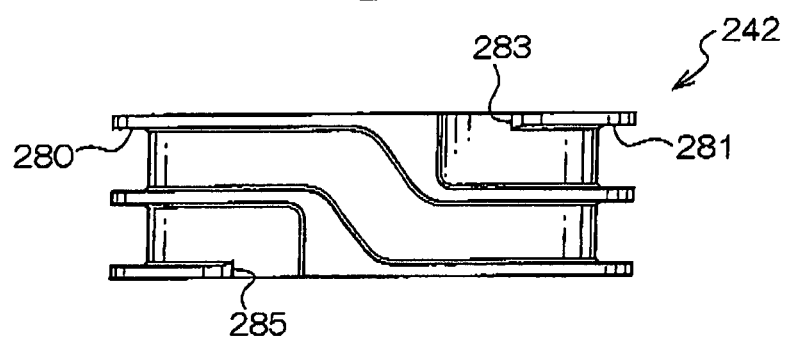
FIG. 7A is a side view in an opposite side to a communication port of the second partition member shown in FIG. 5.
Figure 7B:
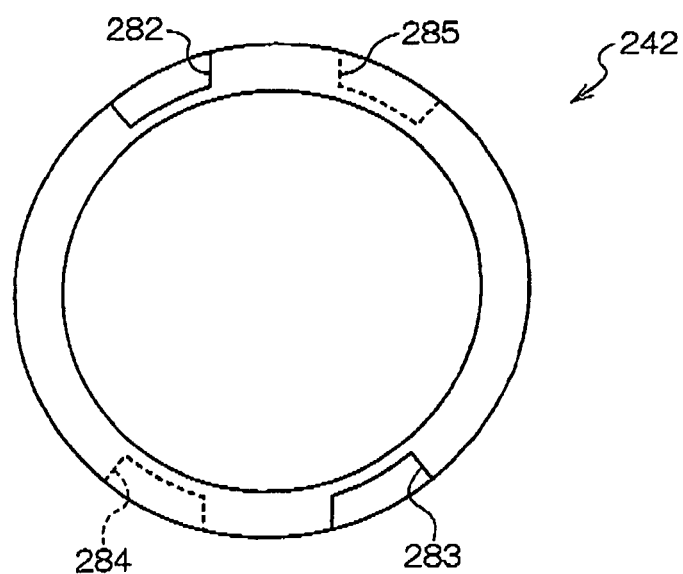
FIG. 7B is a plan view of the second partition member shown in FIG. 5.
Figure 7C:
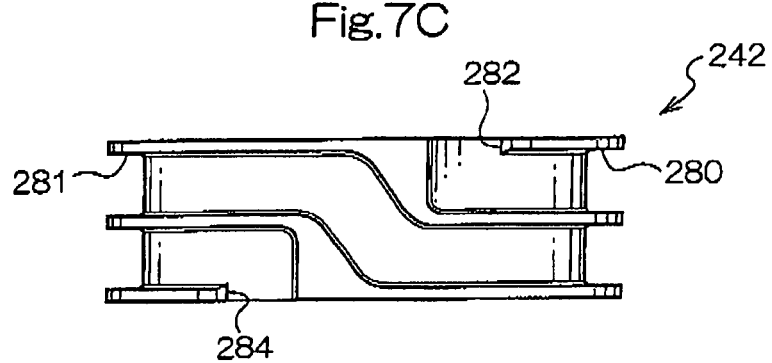
FIG. 7C is a side view in a communication port side of the second partition member shown in FIG. 5.

A first outer peripheral groove 280 extending in a spiral shape near one circle is formed on an outer peripheral surface of the second partition member 242, as shown in FIGS. 7A to 7C, and a second outer peripheral groove 281 extending in a spiral shape near one circle is formed at the different position along the peripheral direction from the first outer peripheral groove 280. Further, in the second partition member 242, there are formed an upper communication port 282 penetrating to an upper side from one end portion of the first outer peripheral groove 280, and a lower communication port 284 penetrating to a lower side from the other end portion of the first outer peripheral groove 280, and there are formed an upper communication port 283 penetrating to an upper side from one end portion of the second outer peripheral groove 281, and a lower communication port 285 penetrating to a lower side from the other end portion of the second outer peripheral groove 281. In the extension portion 250 of the first partition member 240, there is formed a lower notch portion 286 at a position opposing to the lower communication port 284 from an outer peripheral end toward an inner peripheral side, and a lower notch portion 287 is formed at a position opposing to the lower communication port 285 from an outer peripheral end toward an inner peripheral side at a position having a phase which is approximately 180 degree different from a phase of the lower notch portion 286. These lower notch portions 286 and 287 respectively communicate the lower communication port 284 and the lower communication port 285 with the auxiliary liquid chamber 272.

As shown in FIG. 5, a cylindrical large-diameter portion 288 having a large diameter is formed in an upper portion side of the intermediate tube 244, and a cylindrical small-diameter portion 292 having a smaller diameter than the large-diameter portion 288 is integrally formed therein via a step portion 290 extending to an inner peripheral side from a lower end portion of the large-diameter portion 288. In this case, the large-diameter portion 288 has an outer diameter corresponding to the inner diameter of the outer tube 224, and the small-diameter portion 292 has an outer diameter corresponding to the inner diameter of the second partition member 242. The intermediate tube 244 brings the outer peripheral surface of the small-diameter portion 292 to abut against the inner peripheral surface of the second partition member 242, and pressure contacts the outer peripheral surface of the large-diameter portion 288 with the upper end portion of the inner peripheral surface of the outer tube 224 via the coating portion 234. Further, the intermediate tube 244 brings the step portion 290 to abut against the upper surface portion of the second partition member 242. Accordingly, a movement in the axial direction of the second partition member 242 is constrained between the step portion 290 and the extending portion 250 of the first partition member 240. Further, an upper notch portion 294 and an upper notch portion 295 are formed at positions respectively facing to the upper communication port 282 and the upper communication port 283 of the second partition member 242 from the outer peripheral end toward the inner peripheral side, in the step portion 290.

Figure 8:
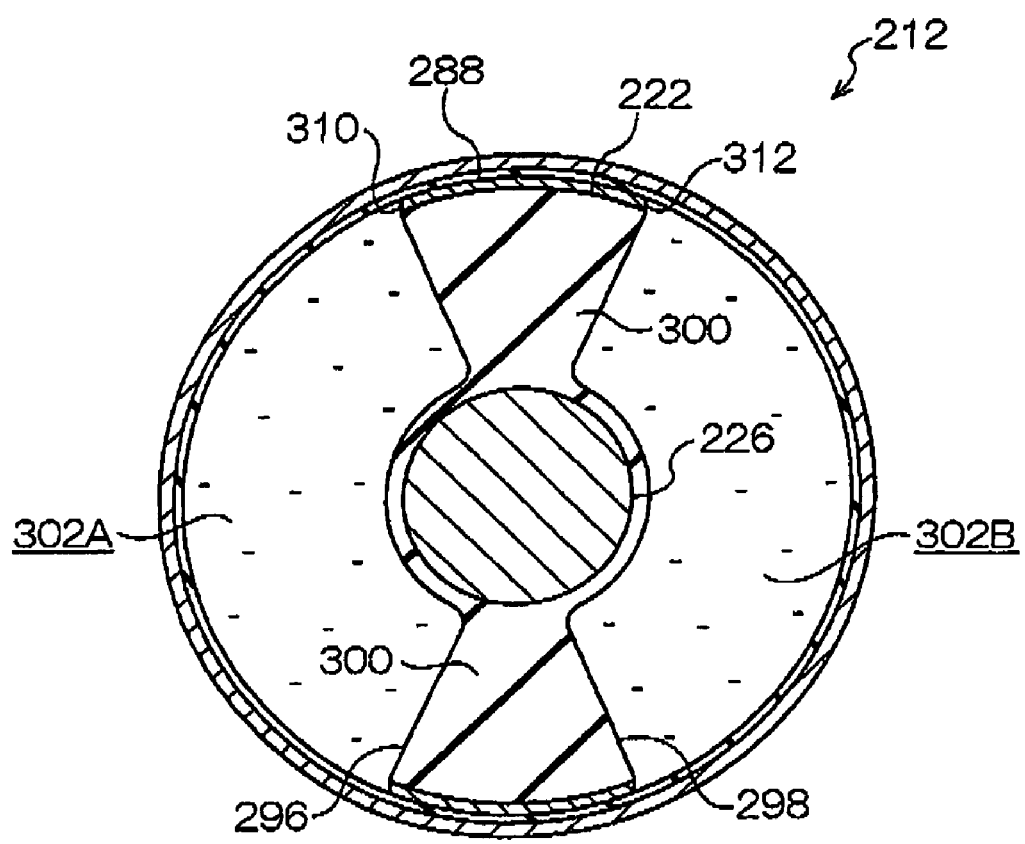
FIG. 8 is a cross sectional view along a cut line VIII-VIII of a main body of the apparatus shown in FIG. 5.

In the intermediate tube 244, a first cavity portion 296 and a second cavity portion 298 each formed in a concave shape from an outer peripheral surface toward an inner peripheral side are formed in one end portion and the other end portion along the diametrical direction, in the portion in an inner peripheral side of the large-diameter portion 288. These cavity portions 296 and 298 are formed in an approximately semicircular shape in a cross sectional shape along the axial direction. Further, the cavity portions 296 and 298 are formed in an approximately fan shape in which a cross sectional shape along the diametrical direction is wide toward an outer peripheral side from an inner peripheral side, as shown in FIG. 8, and in the rubber elastic body 222, there is formed a partition wall portion 300 having an approximately fan-shaped cross section which is wide toward an outer peripheral side from an inner peripheral side, between the first cavity portion 296 and the second cavity portion 298. Further, in the large-diameter portion 288 of the intermediate tube 244, as shown in FIG. 5, there is formed a first opening portion 310 and a second opening portion 312 which respectively face to the first cavity portion 296 and the second cavity portion 298 and are formed in an approximately rectangular shape elongated in a peripheral direction.

Each of the first cavity portion 296 and the second cavity portion 298 is closed in an outer peripheral side by the inner peripheral surface of the outer tube 224 via the coating portion 234. Accordingly, a space comparted from the outer portion is formed within the first cavity portion 296 and the second cavity portion 298, and the space within the first cavity portion 296 is formed as a second pressure receiving liquid chamber 302 filled with the liquid such as the ethylene glycol, the silicone oil or the like. Further, the space within the second cavity portion 297 is formed as a second pressure receiving liquid chamber 308B filled with the liquid such as the ethylene glycol, the silicone oil or the like.

In this case, the outer peripheral groove 280 of the second partition member 242 is closed in the outer peripheral side by the inner peripheral surface of the outer tube 224 via the coating portion 234. The outer peripheral groove 280 closed in the outer peripheral side composes a second orifice 308A communicating the auxiliary liquid chamber 272 and the second pressure receiving liquid chamber 302A with each other together with the upper notch portion 294 of the intermediate tube 244, the communication holes 256 and 264 and the lower notch portion 286 of the first partition member 240. The second orifice 308A can circulate the liquid between the second pressure receiving liquid chamber 302A and the auxiliary liquid chamber 272.

In the vibration proofing apparatus 210 in accordance with the present embodiment, a path length and a cross sectional area of the second orifices 308A and 308B communicating the second pressure receiving liquid chamber 302A and 302B and the auxiliary liquid chamber 272 are set (tuned) in such a manner as to correspond to the frequency (10 Hz to 15 Hz) of the pitching vibration with respect to the vibration along the main amplitude direction, and set (tuned) in such a manner as to correspond to a specific frequency selected from the frequency range between 5 Hz and 20 Hz with respect to the vibration along the auxiliary amplitude direction.

As shown in FIG. 5, in the rubber elastic body 222, a partition wall portion 314A comparting one second pressure receiving liquid chamber 102A from the space in the outer portion of the apparatus is integrally formed in the upper end portion, and there is integrally formed a partition wall portion 314B comparting the other second pressure receiving liquid chamber 302B from the space in the outer portion of the apparatus. The inner peripheral side end portion of each of the partition wall portions 314A and 314B is vulcanization adhered to the outer peripheral surface of the mounting attachment 226, and the outer peripheral side end portion is vulcanization adhered to the inner peripheral surface of the intermediate tube 244. A cross sectional shape along the diametrical direction of each of the partition wall portion 314A and 314B is formed in a curved shape bulging in a convex shape toward the space in the outer portion of the apparatus.

Further, the outer peripheral groove 281 of the second partition member 242 is closed in an outer peripheral side by an inner peripheral surface of the outer tube 224 via the coating portion 234. The outer peripheral groove 281 closed in the outer peripheral side composes a second orifice 308B communicating the auxiliary, liquid chamber 272 and the second pressure receiving liquid chamber 308B with each other together with the upper notch portion 295 of the intermediate tube 244, the communication holes 256 and 264, and the lower notch portion 287 of the first partition member 240. The second orifice 308B can circulate the liquid between the second pressure receiving liquid chamber 308B and the auxiliary liquid chamber 272 with each other. Further, the second orifice 308B is tuned in such a manner as to correspond to the vibration having the frequency in which the path length and the cross sectional area are equal to those of the first pressure receiving liquid chamber 308A.

In the vibration proofing apparatus 210, if the rubber elastic body 222 is elastically deformed in a direction (a second volume expanding and contracting direction) in which the second pressure receiving liquid chamber 302A and the second pressure receiving liquid chamber 302B are arranged, via the mounting attachment 226 in the diametrical direction, each of the internal volumes of the second pressure receiving liquid chamber 302A and the second pressure receiving liquid chamber 302B is expanded and contracted. In this case, a mounting direction of the vibration proofing apparatus 210 in accordance with the present embodiment is adjusted in such a manner that the second volume expanding and contracting direction substantially coincides with an auxiliary amplitude direction mentioned below, in a state of being installed to the vehicle.

In the vibration proofing apparatus 210, when the mounting attachment 226 coupled by the space member 238, the first partition member 240, the second partition member 242 and the rubber elastic body 222, and the intermediate tube 244 are fitted and inserted to a predetermined position within the outer tube 224, the space member 238, the first partition member 240, the second partition member 242 and the intermediate tube 244 are fixed to the outer tube 224 by caulking a whole of the outer tube 224 to an inner peripheral side. Accordingly, an assembly of the apparatus main body 212 is completed, and the apparatus main body 212 is fitted and inserted into the holder portion 216 of the bracket 214 as mentioned above, and is fixed by caulking.

Next, a description will be given of an operation of the vibration proofing apparatus 210 in accordance with the present embodiment structured as mentioned above. In the vibration proofing apparatus 210, when the engine coupled to the mounting attachment 226 is actuated, the vibration from the engine is transmitted to the rubber elastic body 222 via the mounting attachment 226. At this time, the rubber elastic body 222 operates as a vibration absorbing main body, and the input vibration is absorbed due to an attenuation operation by an internal friction or the like generated in accordance with the deformation of the rubber elastic body 222.

At this time, as a main vibration input from the engine, there are listed up a vibration (a main vibration) generated due to reciprocation within the cylinder of the piston within the engine, and a vibration (an auxiliary vibration) generated due to a change or a rotating speed of the crankshaft within the engine. In the case that the engine is of an inline type, an amplitude direction (a main amplitude direction) of the main vibration approximately coincides with a vertical direction of the vehicle, and an amplitude direction (an auxiliary amplitude direction) of the auxiliary vibration approximately coincides with a longitudinal direction of the vehicle orthogonal to the amplitude direction of the main vibration (in which the engine is arranged horizontally) or a lateral direction (in which the engine is arranged vertically). In this case, the rubber elastic body 222 can absorb the input vibration due to the attenuation operation generated by the internal friction or the like, whichever the input vibration is constituted by the main vibration along the main amplitude direction, or the auxiliary vibration along the auxiliary amplitude direction.

Further, in the vibration proofing apparatus 210, since the first pressure receiving liquid chamber 276 is arranged in the lower side in the axial direction of the mounting attachment 226, in the inner peripheral side of the outer tube 224, and the first pressure receiving liquid chamber 276 is communicated with the auxiliary liquid chamber 272 through the first orifice 266, the rubber elastic body 222 is elastically deformed along the main amplitude direction and the internal volume of the first pressure receiving liquid chamber 276 is expanded or contracted, even in the case that the main vibration along the main amplitude direction is input to the mounting attachment 26 from the engine side. Accordingly, the liquid circulates in the first pressure receiving liquid chamber 276 and the auxiliary liquid chamber 272 with each other through the first orifice 266. At this time, since the path length and the cross sectional area in the first orifice 266 are set (tuned) in such a manner as to correspond to the bounds vibration, a resonance phenomenon (a liquid column resonance) is generated in the liquid circulating between the first pressure receiving liquid chamber 276 and the auxiliary liquid chamber 272 through the first orifice 266 mutually in synchronization with the input vibration in the case that the input main vibration is constituted by the bounds vibration. Therefore, it is possible to particularly effectively absorb the shake vibration input along the main amplitude direction due to the pressure change and the viscous resistance of the liquid caused by the liquid column resonance.

Further, in the vibration proofing apparatus 210, in the case that the frequency of the input main vibration is higher than the frequency of the shake vibration, and the amplitude thereof is small, for example, in the case that the input vibration is constituted by the idling vibration (for example, 20 to 30 Hz), and the amplitude is about 0.1 mm to 0.2 mm, the first orifice 266 tuned in such a manner as to correspond to the shake vibration is in a clogged state, and the liquid is hard to flow through the first orifice 266. However, since the movable plate 268 is vibrated within the storage chamber 270 along the axial direction in synchronization with the input vibration, the liquid circulates between the first pressure receiving liquid chamber 276 and the auxiliary liquid chamber 272 through the gap between the inner wall surface of the storage chamber 270 and the movable plate 268, and the opening portions 260 and 265. Therefore, it is possible to suppress an ascent of a dynamic spring constant in accordance with an ascent of a liquid pressure within the first pressure receiving liquid chamber 276, it is possible to maintain the dynamic spring constant of the rubber elastic body 222 low even at a time of inputting the high-frequency vibration mentioned above, and it is possible to effectively absorb the high-frequency vibration due to the elastic deformation of the rubber elastic body 222 or the like.

Further, in the vibration proofing apparatus 210, since two second pressure receiving liquid chambers 302A and 302B arranged between the outer tube 224 and the mounting attachment 226 are respectively communicated with the auxiliary liquid chamber 272 through two second orifices 308A and 308B, the rubber elastic body 222 is elastically deformed along the auxiliary amplitude direction and expands and contracts the internal volume of each of two second pressure receiving liquid chamber 302A and 302B in the case that the vibration along the auxiliary amplitude direction is input to the outer tube 224 or the mounting attachment 226 from the engine side. Therefore, the liquid circulates between these two second pressure receiving liquid chamber 302A and 302B and the auxiliary liquid chamber 272 mutually through the second orifices 308A and 308B.

In this case, since the path length and the cross sectional area in the second orifices 308A and 308B are set in such a manner as to correspond to the specific frequency selected from 5 Hz to 20 Hz with respect to the vibration along the auxiliary amplitude direction, the resonance phenomenon is generated in the liquid circulating between the second pressure receiving liquid chambers 302A and 302B and the auxiliary liquid chamber 272 mutually through the second orifices 308A and 308B, in the case that the input auxiliary vibration has the specific frequency. Therefore, it is possible to effectively absorb the vibration having the specific frequency input along the auxiliary amplitude direction due to the pressure change, the viscous resistance or the like in accordance with the resonance phenomenon of the liquid.

Further, the second pressure receiving liquid chamber2 302A and 302B are arranged between the outer tube 224 and the mounting attachment 226, in the vibration proofing apparatus 210, however, if the rubber elastic body 222 is elastically deformed at a time of inputting the vibration along the main amplitude direction, each of the second pressure receiving liquid chambers 302A and 302B is deformed in accordance with the elastic deformation of the rubber elastic body 222, and the internal volume of each of the second pressure receiving liquid chambers 302A and 302B is increased and decreased. The change amount of the internal volume generated in each of the second pressure receiving liquid chambers 302A and 302B at this time is significantly smaller as compared with the change amount of the internal volume of the first pressure receiving liquid chamber 276, however, the change of the internal volume corresponding to the change amount of the rubber elastic body 222 is securely generated in each of the second pressure receiving liquid chambers 302A and 302B.

Accordingly, in the vibration proofing apparatus 210, the rubber elastic body 222 is elastically deformed along the main amplitude direction, and the internal volume of each of the second pressure receiving liquid chambers 302A and 302B is expanded and contracted, even in the case that the main vibration along the main amplitude direction is input to the mounting attachment 226 from the engine side. Therefore, there is generated a phenomenon that the liquid circulates in each of the second pressure receiving liquid chambers 302A and 302B and the auxiliary liquid chamber 272 mutually through each of the second orifices 308A and 308B.

At this time, since the path length and the cross sectional area in each of the second orifices 308A and 308B are set in such a manner as to correspond to the frequency of the pitching vibration with respect to the vibration along the main amplitude direction, the resonance phenomenon is generated in the liquid circulating between the second pressure receiving liquid chambers 302A and 302B and the auxiliary liquid chamber 272 mutually through the second orifices 308A and 308B, in the case that the input auxiliary vibration has the frequency of the pitching vibration. Therefore, it is possible to particularly effectively absorb the pitching vibration input along the main amplitude direction due to the pressure change, the viscous resistance or the like in accordance with the resonance phenomenon of the liquid.

Further, in the vibration proofing apparatus 210, since two second pressure receiving liquid chambers 302A and 302B are linearly aligned along the longitudinal direction or the lateral direction (the auxiliary amplitude direction) via the mounting metal fitting 226, it is possible to increase a attenuation force obtained from the liquid column resonance with respect to the vibration input along the auxiliary amplitude direction up to about twice as compared with the vibration proofing apparatus 10 (refer to FIG. 1) in accordance with the first embodiment in which only one second pressure receiving liquid chamber 102 is arranged between the outer tube 24 and the mounting attachment 26. Therefore, it is possible to effectively attenuate and absorb the vibration input along the auxiliary amplitude direction.

In this case, in the vibration proofing apparatus 210 in accordance with the present embodiment, since both of the second orifices 308A and 308B are tuned in such a manner as to correspond to the common vibration frequency region (for example, 6 Hz to 10 Hz), the path length and the cross sectional area of each of the second orifices 308A and 308B may be set to different dimensions from each other in such a manner that that a vibration frequency region to which the second orifice 308A corresponds is different from a vibration frequency region to which the second orifice 308B corresponds.

Further, in the vibration proofing apparatus 210, two second pressure receiving liquid chamber 302A and 302B and the mounting attachment 226 are linearly aligned along any one of the longitudinal direction and the lateral direction of the vehicle, however, the structure may be made such that one second pressure receiving liquid chamber 302A and the first mounting attachment 226 are linearly aligned along the longitudinal direction of the vehicle, and the other second pressure receiving liquid chamber 308B and the first mounting attachment 226 are linearly aligned along the lateral direction of the vehicle. Accordingly, it is possible to effectively attenuate and absorb the vibration input from whichever of the longitudinal direction and the lateral direction of the vehicle. At this time, if four second pressure receiving liquid chambers are arranged between the outer tube 224 and the mounting metal fitting 226, two second pressure receiving liquid chambers among them are linearly aligned along the longitudinal direction of the vehicle, and the other two second pressure receiving liquid chambers are linearly aligned along the lateral direction of the vehicle, it is possible to increase the attenuation force against the vibration input from whichever of the longitudinal direction and the lateral direction of the vehicle. Therefore, it is possible to particularly effectively attenuate and absorb these vibrations.

Further, in the vibration proofing apparatus 210, since the second pressure receiving liquid chambers 302A and 302B and the auxiliary liquid chamber 272 are comparted in the inner peripheral side of the outer tube 224, and the second partition member 242 in which the second orifices 308A and 308B are formed is arranged, it is possible to make the interval between the second pressure receiving liquid chambers 302A and 302B and the auxiliary liquid chamber 272 sufficiently wide, and it is possible to make the path length of the second orifices 308A and 308B provided in the second partition member 242 in such a manner as to communicate the second pressure receiving liquid chambers 302A and 302B with the auxiliary liquid chamber 272 sufficiently long. Accordingly, since it is possible to easily tune the path length of the second orifices 308A and 308B so as to correspond to the vibration in the frequency region (for example, 6 Hz to 20 Hz or less) including the low frequency equal to or less than 10 Hz, as compared with the conventional case that a plurality of liquid chambers each having the rubber elastic body as a part of the inner wall are provide, and the orifice communicating these liquid chambers is formed in the rubber elastic body, it is possible to effectively attenuate and absorb the auxiliary vibration having the low frequency by making the path length of the second orifices 308A and 308B long in correspondence to the auxiliary vibration having the low frequency mentioned above, even in the case that the auxiliary vibration input along the auxiliary amplitude direction has the low frequency.

In this case, in the vibration proofing apparatus 210 in accordance with the present embodiment, the outer tube 224 is coupled to the vehicle body side via the bracket 214, and the mounting attachment 226 is coupled to the engine side, however, the structure may be inversely made such that the outer tube 224 is coupled to the engine side, and the mounting attachment 226 is coupled to the vehicle body side.

(Third Embodiment)

Next, a description will be given of a vibration proofing apparatus in accordance with a third embodiment of the present invention.

Figure 9:
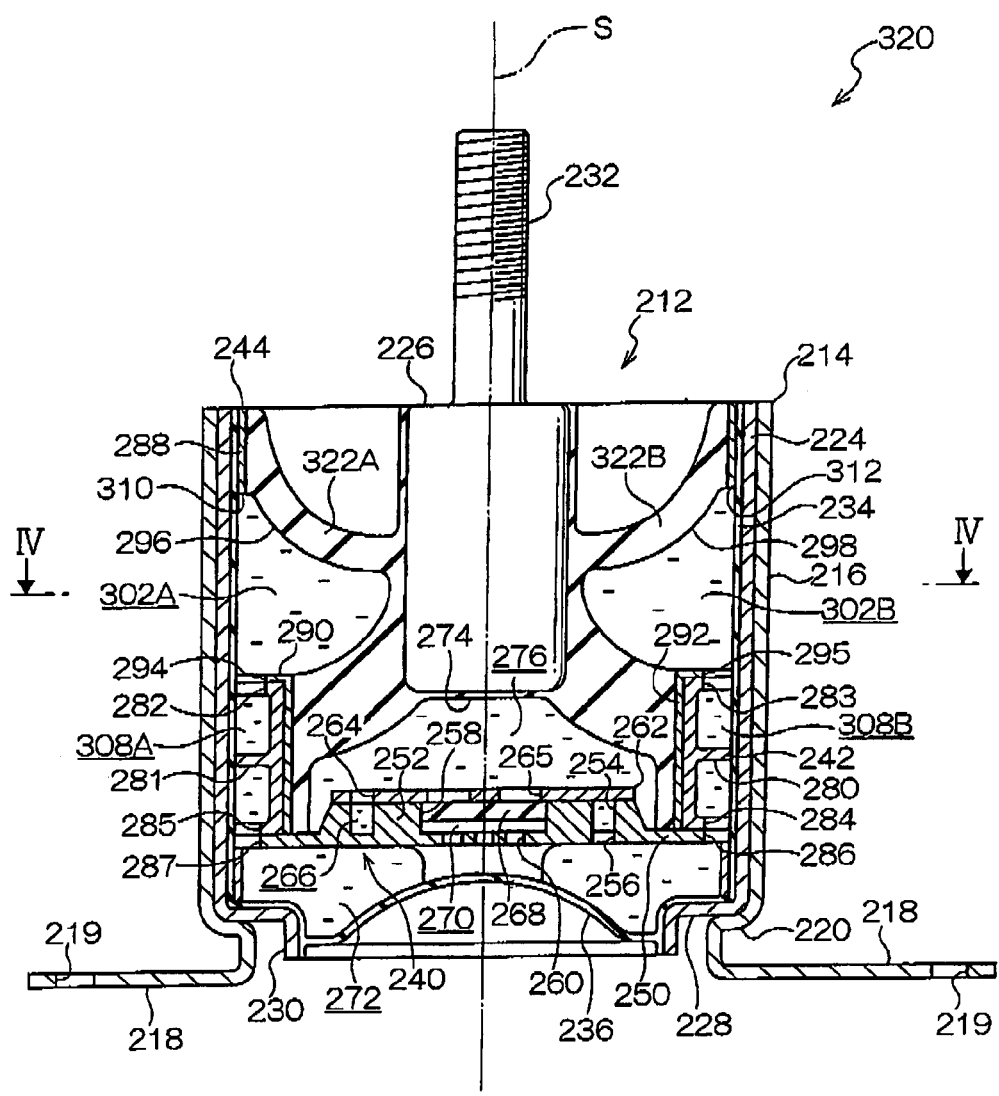
FIG. 9 is a side cross sectional view showing a structure of a vibration proofing apparatus in accordance with a third embodiment of the present invention.
Figure 10:
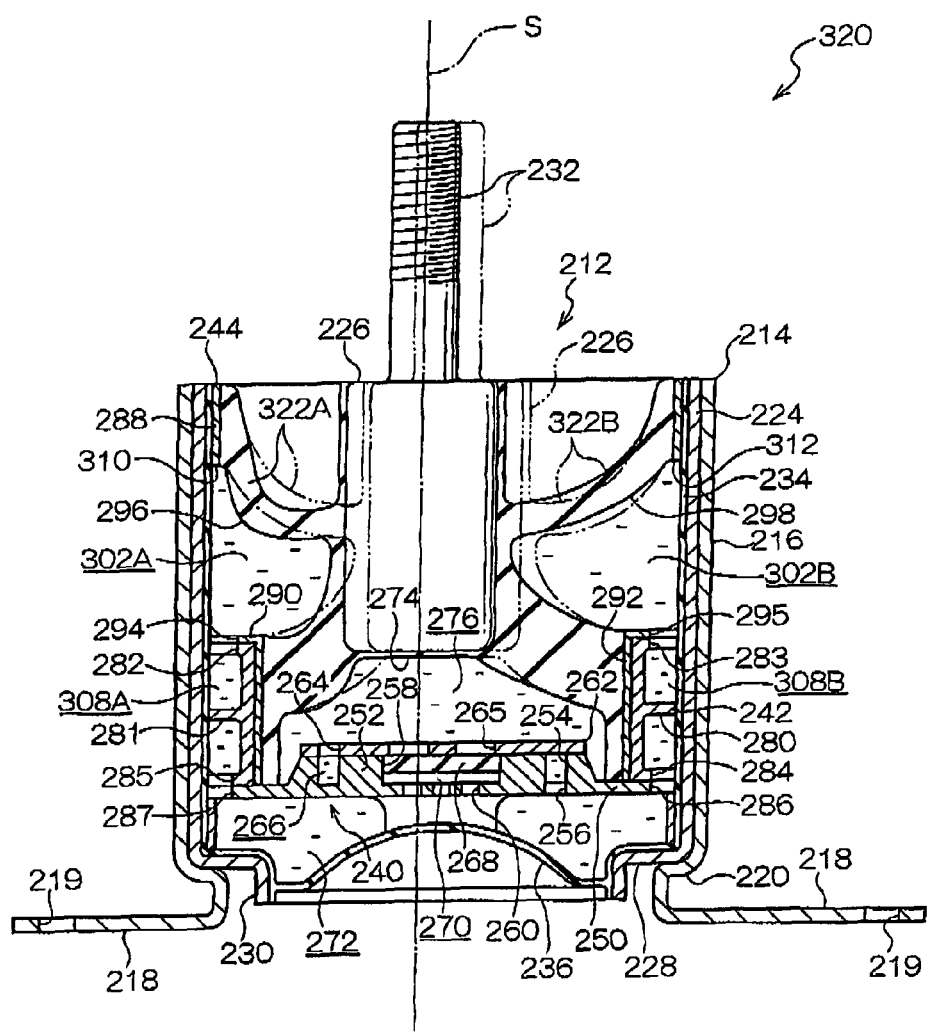
FIG. 10 is a side cross sectional view of the vibration proofing apparatus shown in FIG. 9, and shows a state in which a vibration along an auxiliary amplitude direction is input to the vibration proofing apparatus.

FIGS. 9 and 10 show a vibration proofing apparatus in accordance with a third embodiment of the present invention. In this case, in the vibration proofing apparatus 320 in accordance with the present embodiment, the same reference numerals are attached to portions having the same structures and operations as those of the vibration proofing apparatus 210 (refer to FIG. 5) in accordance with the second embodiment, and a description thereof will be omitted.

As shown in FIG. 9, a vibration proofing apparatus 320 is provided with a rubber elastic body 322 between the intermediate tube 244 and the mounting attachment 226, in the same manner as the vibration proofing apparatus 210 in accordance with the second embodiment 210, a partition wall portion 322A comparting one second pressure receiving liquid chamber 302A from a space in an outer portion of the apparatus is integrally formed in an upper end portion of the rubber elastic body 322, and a partition wall portion 322A comparting the other second pressure receiving liquid chamber 302B from the space in the outer portion of the apparatus is integrally formed therein. These partition wall portions 322A and 322B are vulcanization adhered to the outer peripheral surface of the mounting attachment 226 in respective inner peripheral side end portions, and are vulcanization adhered to the inner peripheral surface of the intermediate tube 244 in outer peripheral side end portions. Further, a cross sectional shape along a diametrical direction of each of the partition wall portions 322A and 322B is formed in such a curved shape as to bulge in a convex shape toward a room inside of the second pressure receiving liquid chambers 302A and 302B, and a curved direction thereof is inversed to that of the partition wall portions 314A and 314B of the vibration proofing apparatus 210 in accordance with the second embodiment.

Next, a description will be given of a motion and an operation of the vibration proofing apparatus 320 in accordance with the present embodiment structured as mentioned above.

In the vibration proofing apparatus 320 in accordance with the present embodiment, since the cross sectional shape along the diametrical direction of each of the partition wall portions 322A and 322B in the rubber elastic body 322 is formed in such the curved shape as to bulge in the convex shape toward the room inside of the second pressure receiving liquid chambers 302A and 302B, it is possible to increase the circulating amount of the liquid circulating between the second pressure receiving liquid chambers 302A and 302B and the auxiliary liquid chamber 272 through the second orifices 308A and 308B, as compared with the vibration proofing apparatus 210 in accordance with the second embodiment, at a time when the auxiliary vibration along the longitudinal direction or the lateral direction is input. Therefore, it is possible to increase the attenuation effect with respect to the auxiliary vibration as compared with the vibration proofing apparatus 210.

A description will be given of a shape operation of the partition wall portions 322A and 322B in the rubber elastic body 322 mentioned above with reference to FIG. 10. FIG. 10 shows a state in which the mounting attachment 226 is displaced to one end side (a left end side in FIG. 10) along the auxiliary amplitude direction at a time when the auxiliary vibration is input to the vibration proofing apparatus 320 by a solid line, and shows a state in which, the mounting attachment 226 exists at an approximately neutral position along the auxiliary amplitude direction by a two-dot chain line (an imaginary line).

As shown in FIG. 10, the mounting attachment 226 is displaced to the one end side along the auxiliary amplitude direction in accordance with the input of the auxiliary vibration, the second pressure receiving liquid chamber 302A arranged in one end side along the auxiliary amplitude direction is compressed, and the second pressure receiving liquid chamber 302B arranged in the other end side is expanded. At this time, in the vibration proofing apparatus 320, at the same time when the partition wall portion 322A in one end side is elastically deformed in such a manner that an ingression amount (a curving amount) into the second pressure receiving liquid chamber 302A is increased, the partition wall portion 322B in the other end side is elastically deformed in such a manner that an ingression amount (a curving amount) into the second pressure receiving liquid chamber 302B is decreased. Accordingly, in the vibration proofing apparatus 320, as compared with the vibration proofing apparatus 210 shown in FIG. 5, it is possible to effective promote the decrease of the internal volume of one of the second pressure receiving liquid chambers 302A and 302B compressively deformed along the auxiliary amplitude direction at a time of inputting the auxiliary vibration, and it is possible to effective promote the increase of the internal volume of the other of the second pressure receiving liquid chambers 302A and 302B expanded along the auxiliary amplitude direction.

As a result, in accordance with the vibration proofing apparatus 320 due to the present embodiment, it is possible to absorb each of the vibration (the main vibration) along the vertical direction and the vibration (the auxiliary vibration) along the longitudinal direction or the lateral direction due to the attenuation operation generated by the rubber elastic body 322, the operation of the liquid column resonance generated in the liquid circulating between the first pressure receiving liquid chamber 276 and the auxiliary liquid chamber 272 through the first orifice 266, and the operation of the liquid column resonance generated in the liquid circulating between the second pressure receiving liquid chambers 302A and 302B and the auxiliary liquid chamber 272 through the second orifices 308A and 308B, and the like, basically in the same manner as the vibration proofing apparatus 210 in accordance with the second embodiment.

Further, in accordance with the vibration proofing apparatus 320 due to the present embodiment, since it is possible to increase the circulating amount of the liquid circulating between the second pressure receiving liquid chambers 302A and 302B and the auxiliary liquid chamber 272 through the second orifices 308A and 308B at a time when the auxiliary vibration is input, as compared with the vibration proofing apparatus in accordance with the second embodiment, it is possible to increase the attenuation effect with respect to the auxiliary vibration obtained by the liquid column resonance, in the case that the auxiliary vibration has a specific frequency selected from the frequency range between 5 Hz and 20 Hz, and the liquid column resonance is generated in the liquid circulating within the second orifices 308A and 308B in accordance with the input of the auxiliary vibration.

In this case, even in the case that the partition wall portion 114 in the vibration proofing apparatus 10 in accordance with the first embodiment is replaced by a partition wall portion having such a curved shape as to bulge in a convex shape toward an inner side of the second pressure receiving liquid chamber 102, it is possible to increase the circulating amount 36. of the liquid circulating between the second pressure receiving liquid chamber 102 and the auxiliary liquid chamber 72 through the second orifice 108, even by the vibration proofing apparatus having the replaced partition wall portion, at a time when the auxiliary vibration is input. Accordingly, there is obtained an effect that it is possible to increase the attenuation effect with respect to the auxiliary vibration having the specific frequency, as compared with the vibration proofing apparatus 210 in accordance with the first embodiment.

EXAMPLE

In order to confirm the operations and effects obtained by the vibration proofing apparatus in accordance with the present invention, there are manufactured a vibration proofing apparatus (an example) basically having the same structure as that of the vibration proofing apparatus 320 shown in FIGS. 9 and 10, and a vibration proofing apparatus (a comparative example) having a conventional structure in which the second pressure receiving liquid chambers 302A and 302B and the second orifices 308A and 308B are omitted from the vibration proofing apparatus 320 in accordance with the present invention, and a vibration input test is executed by using the vibration proofing apparatus in accordance with the example and the vibration proofing apparatus in accordance with the comparative example. A description will be given below of results of the vibration input test.

Figure 11:
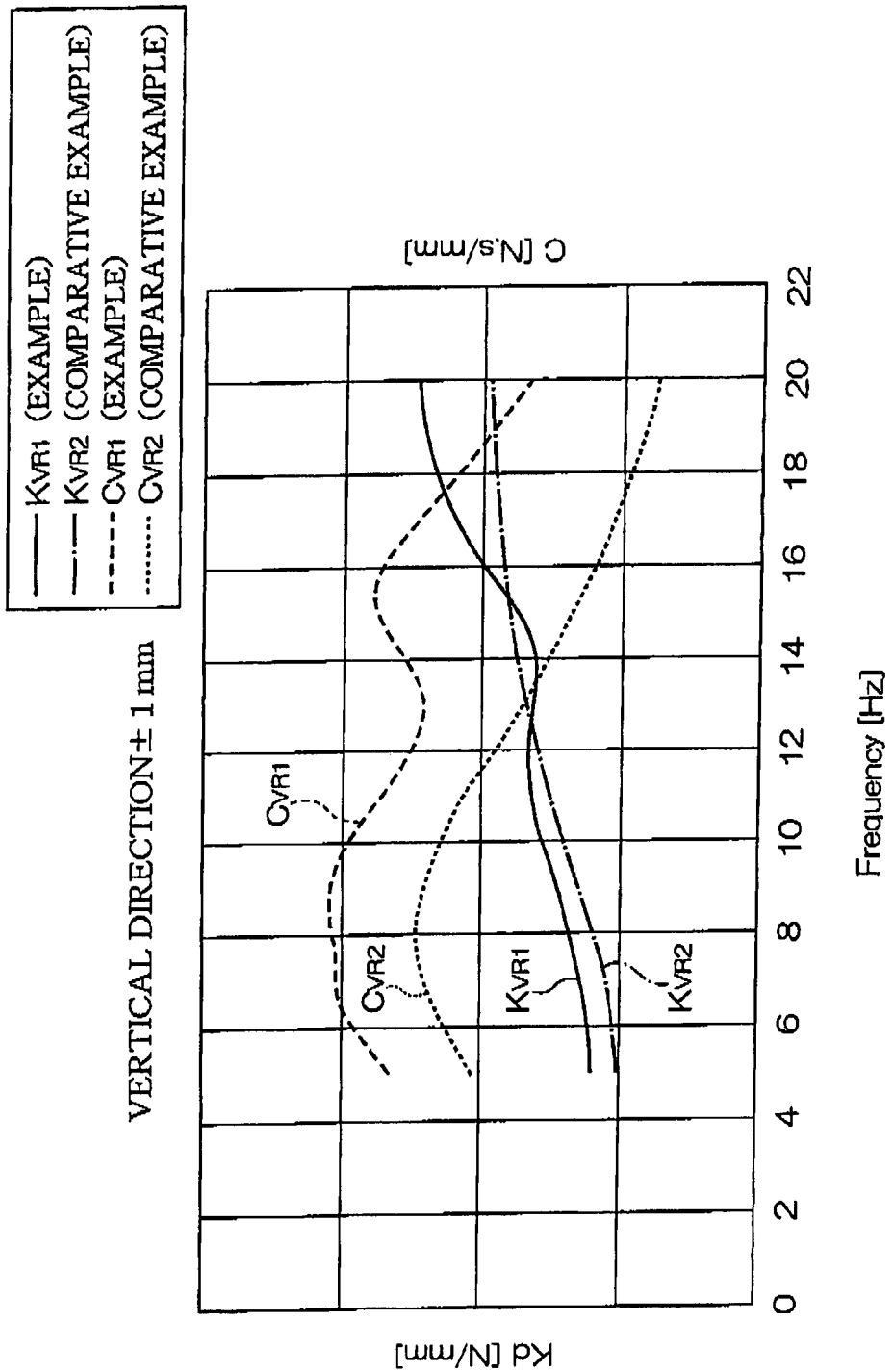
FIG. 11 is a graph showing a relation between a vibration frequency and an attenuation, and a relation between the vibration frequency and a dynamic spring constant in the case that a vibration along a main amplitude direction is input to a vibration proofing apparatus in accordance with an example and a vibration proofing apparatus in accordance with a comparative example.

FIG. 11 shows a relation between a vibration frequency Fr and an attenuation C, and a relation between the vibration frequency Fr and a dynamic spring constant Kd, in the case that a vibration (a main vibration) having an amplitude of ±1 mm along a vertical direction set as a main amplitude direction, is input to the vibration proofing apparatuses in accordance with the example and the comparative example.

Figure 12:
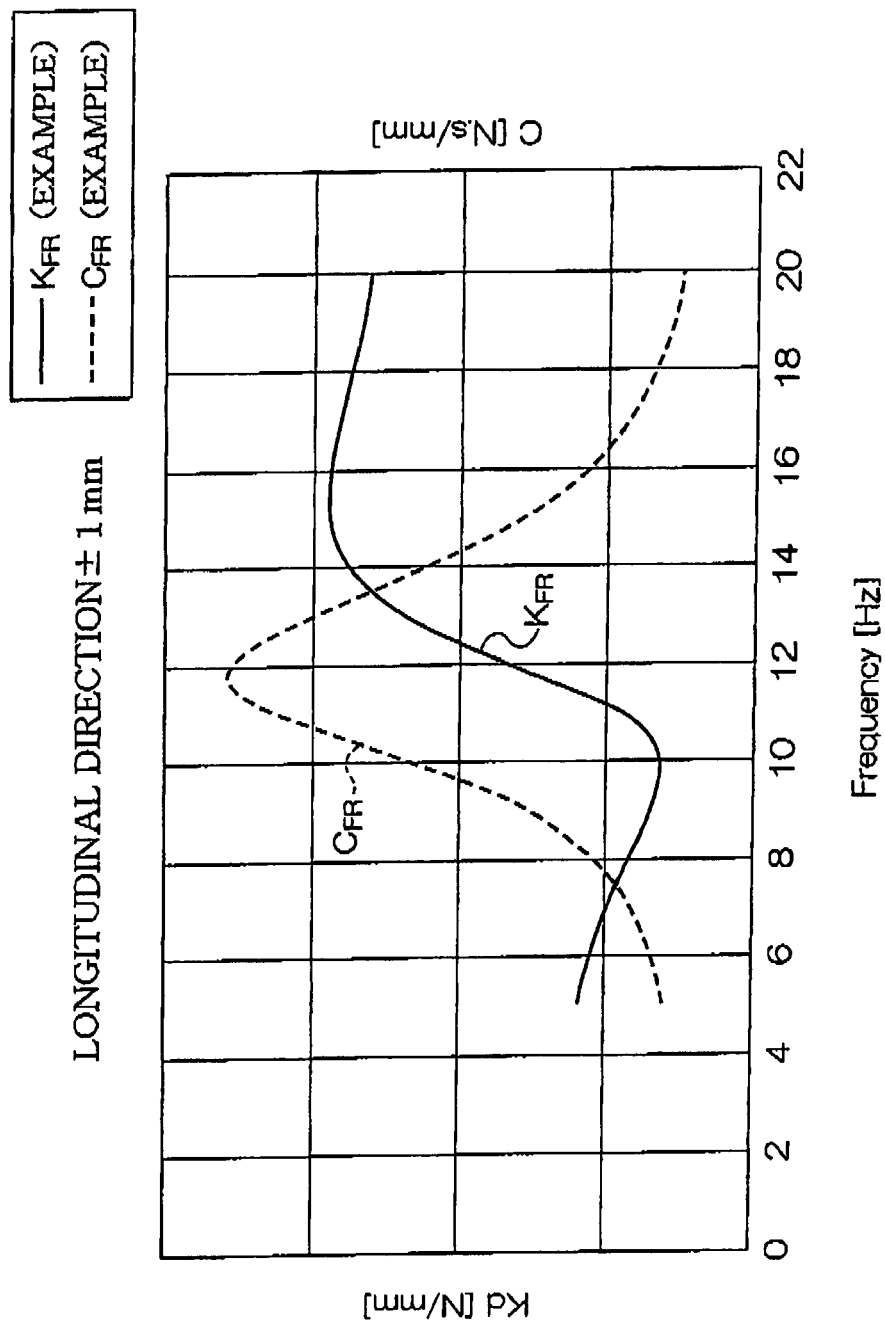
FIG. 12 is a graph showing a relation between the vibration frequency and the attenuation, and a relation between the vibration frequency and the dynamic spring constant in the case that a vibration along an auxiliary amplitude direction is input to the vibration proofing apparatus in accordance with the example.

Further, FIG. 12 shows a relation between the vibration frequency Fr and the attenuation C, and a relation between the vibration frequency Fr and the dynamic spring constant Kd, in the case that a vibration (an auxiliary vibration) having an amplitude of ±1 mm along a longitudinal direction set as an auxiliary amplitude direction, is input to the vibration proofing apparatuses in accordance with the example and the comparative example.

First, a description will be given of the attenuation with respect to the vibration along the vertical direction obtained by the vibration proofing apparatus in accordance with the example and the vibration proofing apparatus in accordance with the comparative example. As is apparent from FIG. 11, an attenuation $C_{VR1}$ obtained by the vibration proofing apparatus in accordance with the example is larger than an attenuation $C_{VR2}$ obtained by the vibration proofing apparatus in accordance with the comparative example, in a wide frequency range between 5 Hz and 20 Hz.

Further, a peak (a local maximum) obtained by the operation of the liquid column resonance is indicated only around 8 Hz in the attenuation $C_{VR2}$, however, the peak obtained by the operation of the liquid column resonance is indicated in two frequencies around 8 Hz and 15 Hz in the attenuation $C_{VR1}$.

In this case, it is considered that the peak of the attenuation $C_{VR1}$ around 8 Hz is obtained by the liquid column resonance within the first orifice communicating between the first pressure receiving liquid chamber and the auxiliary liquid chamber, and the peak of the attenuation $C_{VR1}$ around 15 Hz is obtained by the liquid column resonance within two second orifices communicating between two second pressure receiving liquid chambers and the auxiliary liquid chamber. Further, in the vibration proofing apparatus in accordance with the example, since the liquid circulation is always generated between the second pressure receiving liquid chamber and the auxiliary liquid chamber through two second orifices in the frequency range between 5 Hz and 20 Hz, it is considered that the attenuation $C_{VR1}$ becomes larger than the attenuation $C_{VR2}$.

Next, a description will be given of a dynamic spring constant with respect to the vibration along the vertical direction obtained by the vibration proofing apparatus in accordance with the example and the vibration proofing apparatus in accordance with the comparative example. As is apparent from FIG. 11, an attenuation $K_{VR1}$ obtained by the vibration proofing apparatus in accordance with the example tends to become gradually lager than a dynamic spring constant $K_{VR2}$ of the vibration proofing apparatus in accordance with the comparative example in correspondence to an increase of the frequency, in the frequency range over 15 Hz. It is considered that this is because a clogging is generated in the second orifice in correspondence to an increase of the frequency in the frequency range over 15 Hz, and the circulation resistance of the liquid passing through the second orifice is increased in correspondence to the increase of the frequency, in the vibration proofing apparatus in accordance with the example.

On the other hand, it is understood that the attenuation $C_{FR}$ obtained by the vibration proofing apparatus in accordance with the example indicates a sharp peak around 12 Hz, as is apparent from FIG. 12, and in the case that the frequency of the input vibration along the longitudinal direction is around 12 Hz, the liquid column resonance is generated in the liquid circulating in the second orifice, and it is possible to particularly effectively absorb the vibration in the longitudinal direction having the frequency around 12 Hz due to the liquid column resonance. Of course, the resonance frequency can be adjusted to a desired frequency by appropriately adjusting the rigidity along the longitudinal direction of the rubber elastic body, and the path length and the cross sectional area of the second orifice.

What is claimed is:

1. A vibration proofing apparatus comprising:
    a first mounting member coupled to one of a vibration generating portion and a vibration receiving portion, and formed in an approximately tubular shape;
    a second mounting member coupled to the other of the vibration generating portion and the vibration receiving portion, and arranged in an inner peripheral side of the first mounting member;
    a rubber elastic body arranged between the first mounting member and the second mounting member, and elastically coupling the first mounting member and the second mounting member;
    a first pressure receiving liquid chamber arranged at an axial end of the second mounting member, and in an inner peripheral side of the first mounting member, and in which at least a part of an inner wall is formed by the elastic body, and a liquid is filled;
    an auxiliary liquid chamber in which the liquid is filled, a part of a partition wall is formed by a diaphragm and an internal volume is capable of being expanded and contracted in correspondence to a liquid pressure change;
    a first limit passage communicating the first pressure receiving liquid chamber and the auxiliary liquid chamber with each other so as to make the liquid circulatable;
    a second pressure receiving liquid chamber arranged between the first mounting member and the second mounting member, and in which at least a part of an inner wall is formed by the elastic body, and the liquid is filled;
    a second limit passage communicating the second pressure receiving liquid chamber and the auxiliary liquid chamber with each other so as to make the liquid circulatable; and
    a partition member arranged in an inner peripheral side of the first mounting member, the partition member comparting the first pressure receiving liquid chamber and the auxiliary liquid chamber, and the second pressure receiving liquid chamber and the auxiliary liquid chamber;
    wherein the rubber elastic body comparts the first pressure receiving liquid chamber and the second pressure receiving liquid chamber.

2. The vibration proofing apparatus of claim 1, wherein the second limit passage is formed in the partition member.

3. The vibration proofing apparatus of claim 1, wherein when the elastic body is elastically deformed by the input of the vibration along a main amplitude direction approximately coinciding with the axial direction to the first mounting member or the second mounting member, the elastic body expands and contracts an internal volume of the first pressure receiving liquid chamber due to the elastic deformation along the main amplitude direction.

4. The vibration proofing apparatus of claim 3, wherein when the elastic body is elastically deformed by the input of the vibration along an auxiliary amplitude direction approximately orthogonal to the axial direction to the first mounting member or the second mounting member, the elastic body expands and contracts an internal volume of the second pressure receiving liquid chamber due to the elastic deformation along the auxiliary amplitude direction.

5. The vibration proofing apparatus of claim 4, wherein the second pressure receiving liquid chamber is provided in one end side along the auxiliary amplitude direction between the first mounting member and the second mounting member, a cavity portion is provided in an other end side along the auxiliary amplitude direction between the first mounting member and the second mounting member, and at least a part of an inner wall of the cavity portion is formed by the elastic body, thereby approximately balancing a rigidity against an input load toward the one end side along the auxiliary amplitude direction of the elastic body and an input load toward the other end side.

6. The vibration proofing apparatus of claim 1, wherein when the elastic body is elastically deformed by the input of the vibration along a main amplitude direction approximately coinciding with the axial direction to the first mounting member or the second mounting member, the elastic body expands and contracts an internal volume of the first pressure receiving liquid chamber and the second pressure receiving liquid chamber due to the elastic deformation along the main amplitude direction.

7. A vibration proofing apparatus comprising:
a first mounting member coupled to one of a vibration generating portion and a vibration receiving portion, and formed in an approximately tubular shape;
a second mounting member coupled to the other of the vibration generating portion and the vibration receiving portion, and arranged in an inner peripheral side of the first mounting member;
a rubber elastic body arranged between the first mounting member and the second mounting member, and elastically coupling the first mounting member and the second mounting member;
a first pressure receiving liquid chamber arranged at an axial end of the second mounting member, and in an inner peripheral side of the first mounting member, and in which at least a part of an inner wall is formed by the elastic body, and a liquid is filled;
an auxiliary liquid chamber in which the liquid is filled, a part of a partition wall is formed by a diaphragm and an internal volume is capable of being expanded and contracted in correspondence to a liquid pressure change;
a first limit passage communicating the first pressure receiving liquid chamber and the auxiliary liquid chamber with each other so as to make the liquid circulatable;
a plurality of second pressure receiving liquid chambers arranged between the first mounting member and the second mounting member, and in which at least a part of an inner wall is formed by the elastic body, and the liquid is filled;
a plurality of second limit passages communicating each of the plurality of second pressure receiving liquid chambers with the auxiliary liquid chamber so as to make the liquid circulatable between the plurality of second pressure receiving liquid chambers and the auxiliary liquid chamber; and
a partition member arranged in an inner peripheral side of the first mounting member, the partition member comparting the first pressure receiving liquid chamber and the auxiliary liquid chamber, and the second pressure receiving liquid chambers and the auxiliary liquid chamber;
wherein the rubber elastic body comparts the first pressure receiving liquid chamber and the second pressure receiving liquid chambers.

8. The vibration proofing apparatus of claim 7, wherein the plurality of second limit passages are formed in the partition member.

9. The vibration proofing apparatus of claim 7, wherein when the elastic body is elastically deformed by the input of the vibration along a main amplitude direction approximately coinciding with the axial direction to the first mounting member or the second mounting member, the elastic body expands and contracts an internal volume of the first pressure receiving liquid chamber due to the elastic deformation along the main amplitude direction.

10. The vibration proofing apparatus of claim 9, wherein when the elastic body is elastically deformed by the input of the vibration along an auxiliary amplitude direction approximately orthogonal to the axial direction to the first mounting member or the second mounting member, the elastic body expands and contracts an internal volume of the second pressure receiving liquid chambers due to the elastic deformation along the auxiliary amplitude direction.

11. The vibration proofing apparatus of claim 8, wherein when the elastic body is elastically deformed by the input of the vibration along a main amplitude direction approximately coinciding with the axial direction to the first mounting member or the second mounting member, the elastic body expands and contracts an internal volume of the first pressure receiving chamber and the second pressure receiving liquid chambers due to the elastic deformation along the main amplitude direction.

12. The vibration proofing apparatus of claim 10, wherein a pair of the second pressure receiving liquid chambers are provided between the first mounting member and the second mounting member, one of the second pressure receiving liquid chambers is arranged in one end side along the auxiliary amplitude direction between the first mounting member and the second mounting member, and the other of the second pressure receiving liquid chambers is arranged in the other end side along the auxiliary amplitude direction between the first mounting member and the second mounting member.

13. The vibration proofing apparatus of claim 1, wherein an elastic partition wall portion is formed in the elastic body, the elastic partition wall portion comparts the second pressure receiving liquid chamber from an external space, and is elastically deformable in a direction of expanding and contracting the internal volume of the second pressure receiving liquid chamber, and a cross sectional shape along the auxiliary amplitude direction of the elastic partition wall portion is formed in such a curved shape as to bulge toward a room inside of the second pressure receiving liquid chamber.

* * * * *